US 8,401,878 B2

(12) United States Patent
Stender et al.

(10) Patent No.: US 8,401,878 B2
(45) Date of Patent: Mar. 19, 2013

(54) METHOD AND SYSTEM FOR CONNECTING AN INSURED TO AN INSURER USING A MOBILE DEVICE

(76) Inventors: Mark Stender, Farmington, CT (US); Paul Simeone, West Hartford, CT (US)

( * ) Notice: Subject to any disclaimer, the term of this patent is extended or adjusted under 35 U.S.C. 154(b) by 354 days.

(21) Appl. No.: 12/683,225

(22) Filed: Jan. 6, 2010

(65) Prior Publication Data

US 2010/0174564 A1 Jul. 8, 2010

Related U.S. Application Data

(60) Provisional application No. 61/142,665, filed on Jan. 6, 2009.

(51) Int. Cl.
*G06Q 40/00* (2012.01)
(52) U.S. Cl. ............... 705/4; 705/35; 705/36 R; 705/40; 705/1.1
(58) Field of Classification Search .................. 705/1.1, 705/4, 35, 40, 64, 2, 36 R; 455/451; 283/54
See application file for complete search history.

(56) References Cited

U.S. PATENT DOCUMENTS

| 8,019,629 | B1 * | 9/2011 | Medina et al. ................. 705/4 |
| 2008/0312968 | A1 * | 12/2008 | Hannon et al. ................. 705/4 |
| 2010/0030586 | A1 * | 2/2010 | Taylor et al. ................. 705/4 |

OTHER PUBLICATIONS

"A mortgagee's interest in casualty loss proceeds: Evolving rules and risks" Randolph, Patrick A Jr; Real Property Probate & Trust Journal v32 n1 pp. 1-44 Spring 1997.*

* cited by examiner

*Primary Examiner* — John H Holly
(74) *Attorney, Agent, or Firm* — McCormick, Paulding & Huber LLP

(57) ABSTRACT

A system and method for connecting an insured to an insurer using a mobile device in order to provide insurance services. The mobile device, which is associated with the insured, includes a mobile insurance module that is in communication with a server insurance module of a server, which is associated with the insurer. Together, the mobile insurance module and the server insurance module establish a communication channel with the insurer over which insurance services (e.g., requesting a quote, buying a policy, filing a claim and reviewing account information) are provided. The communication channel leverages the technological capabilities of the mobile device, such as a smart phone, to deliver data in a fast, efficient and integrated manner having robust functionalities.

16 Claims, 12 Drawing Sheets

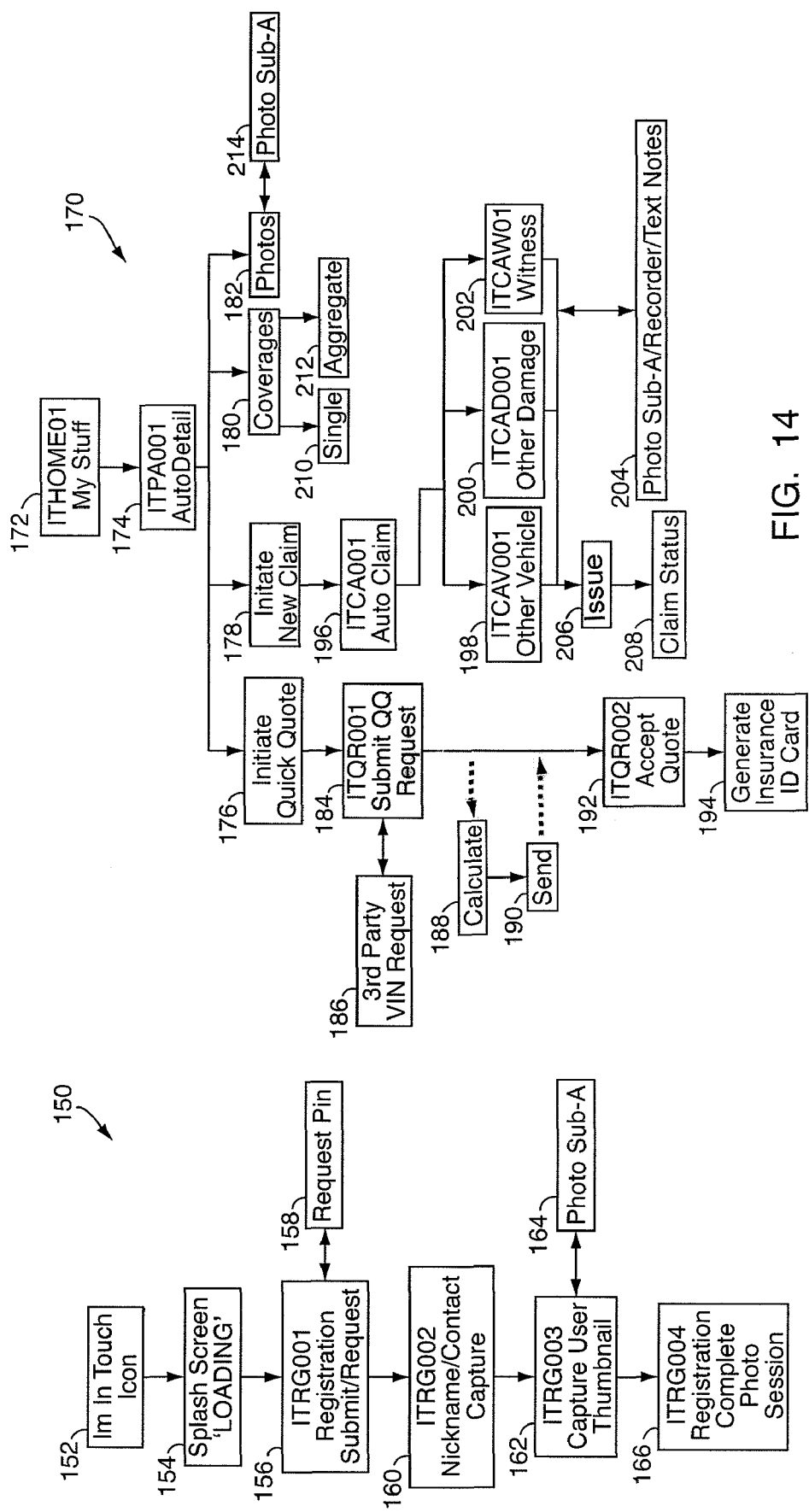

METHOD AND SYSTEM FOR CONNECTING AN INSURED TO AN INSURER USING A MOBILE DEVICE

CROSS-REFERENCE TO RELATED APPLICATIONS

This application claims the benefit of U.S. Provisional Application Ser. No. 61/142,665, filed on Jan. 6, 2009, herein incorporated by reference in its entirety.

FIELD OF THE INVENTION

The invention relates to a method and system for connecting insureds to insurers using a mobile device. In particular, the present invention relates to a method and system for connecting insureds more closely to insurers by leveraging the most technically advanced mobile smart phone technology, such as the Apple iPhone.

BACKGROUND OF THE INVENTION

Currently, an insured or potential customer (hereinafter the "insured") must call an insurance company or carrier (hereinafter the "insurer") to make an inquiry, modify an existing policy or report a loss. The insured will provide some preliminary information, such as the insured's name, policy number and the purpose of the communication, and then be instructed to gather and/or provide additional information specific to that interaction. The collection and processing of this information can be time consuming and complex, involving many manual steps and duplicative actions on the part of the insured and the insurer.

As a result, the known process of interaction of insureds with insurers causes extended timelines, claim backlogs and delayed resolutions to the communication, whether that entails forming a new policy, modifying an existing policy, settling a claim, coordinating subrogation or the like. It is known that such delays have numerous negative effects on the insurance system. For instance, the insurer's ability to capture a potential customer as a new insured and the satisfaction of the insured with the insurer is impacted, in part, by the length and complexity of the interactions. In addition, the insurer's liability exposure on a claim increases as the amount of time between filing and resolution of the claim increases. There is a need for a means of enabling insureds and insurers to interact in a faster and more streamlined manner.

The known interaction of insureds and insurers also consumes a significant amount of resources. In particular, the lengthy resolution of interactions diverts resources away from selling new business, improving the insured's experience with the insurer and improving the operation of the insurer. For instance, resources expended by the insurer on customer service and claim handling cannot be used to sell new business and retain existing insureds. As a result, there are few incentives to effectively perform customer service, claim handling and routine maintenance tasks. There is a need for a means of reducing the amount of resources expended by the insureds and, particularly, the insurers to interact with one another.

The known interaction of insureds and insurers also results in duplicative actions on the part of the insured and the insurer. In particular, during a typical interaction over the telephone, the insured verbally states information to a customer service representative, a claim handler or another representative (hereinafter an "agent") of the insurer who transcribes the stated information, for instance, into a computer program. Verbal transmission of information is slow, inaccurate and can result in a negative experience for the insured. There is a need for a means of enabling the insured and the insurer to interact with less verbal transmission of information.

However, some verbal interaction is necessary and even desirable. The known interaction of insureds and insurers is verbally intensive and although some information can be gathered automatically or using a touch-tone phone entry system, such as a call directory or an authorization system, there is an inherent inaccuracy or degree of imprecision in these systems that must be corrected verbally. In addition, verbal communication provides an opportunity for personal contact that fosters loyalty and trust. There is a need for a means of enabling the insured and the insurer to interact in a more accurate and precise manner that emphasizes loyalty and trust building exchanges.

The known interaction of insureds and insurers also relies upon a variety of communication channels. Telephones play a central role in connecting the insureds and insurers, but are not capable of transmitting all required information. For instance, photographs of a loss, such as a car accident, and copies of invoices for repairs or replacements relating to the loss may need to be mailed through the post or transmitted via facsimile. Using a variety of communication channels increases the complexity of administering the information flow between the insureds and insurers. There is a need for a means of enabling the insured and the insurer to interact through a unified communication channel that can transmit all, or nearly all, required information.

The object of the present invention is, therefore, to provide an improved system for connecting insureds and insurers, which, among other desirable attributes, significantly reduces or overcomes the above-mentioned deficiencies of prior interactions.

SUMMARY OF THE INVENTION

Accordingly, the present invention provides a method and system for connecting insureds more closely to insurers by leveraging the most technically advanced mobile smartphone technology, such as the Apple iPhone, to deliver services to the point at which they are needed most.

It is an object of the present invention to provide a method and system that connects insureds and insurers using a mobile device, such as a smart phone.

It is an object of the present invention to provide a method and system including an insurance software application designed for smart phone mobile devices with a phone mode, a voice recorder mode, a short message service ("SMS") text mode, an e-mail mode, a digital camera mode, a digital video recording mode, a photograph gallery mode, a video gallery mode, a global positioning system ("GPS") mode, and other input devices, such as a touch screen, in a coordinated and insurance policy-directed manner.

It is an object of the present invention to provide a method and system that connects insureds and insurers wirelessly in real-time from almost any location, at any time of day.

It is an object of the present invention to provide a method and system that connects insureds to the insurers to access services when and where they are needed most.

It is an object of the present invention to provide a method and system that connects insureds to the insurers to enable the insured to be in constant multifaceted contact with a knowledgeable agent of the insurer substantially immediately after an accident or loss.

It is an object of the present invention to provide a method and system that connects insureds and insurers to enable an insured to access services and information spanning the entire insurance relationship including: policy quotes; policy formation; asset, policy and insurance information; policy coverages and limit information; payment, billing and accounting information; and claim status information.

It is an object of the present invention to provide a method and system that connects insureds and insurers in a timely and streamlined manner.

It is an object of the present invention to provide a method and system that connects insureds and insurers to accomplish tasks that were previously time and labor intensive, or could only be achieved through written communications, a phone call during working hours to an agent or insurer and recently, to a lesser extent, using a personal computer.

It is an object of the present invention to provide a method and system that connects insureds and insurers immediately via the mobile device to enable an insured who suffers a loss to access an agent of the insurer who will provide advice and support to the insured at the scene of the accident or loss.

It is an object of the present invention to provide a method and system that connects insureds and insurers in an efficient manner.

It is an object of the present invention to provide a method and system that connects insureds and insurers in a manner that enables a maximum amount of information to be transmitted via digital text and photographic formats.

It is an object of the present invention to provide a method and system that connects insureds and insurers using a unified communication channel capable of transmitting voice communications, voice recordings, SMS text messages, e-mails, digital photographs, digital video recordings, and GPS information.

It is an object of the present invention to provide a method and system that connects insureds and insurers in a manner that accurately and precisely directs the insured to the proper agent of the insurer and provides the agent with information specific to the insured's communication.

It is an object of the present invention to provide a method and system that connects insureds and insurers in a manner that enhances verbal interactions by emphasizing loyalty and trust building exchanges.

It is an object of the present invention to provide a method and system that connects insurers and, in particular, young automobile policy holder insureds who have statistically high accident rates, are the customers who tend to be early adopters of new technology, and in a manner that provides particular assurance to parents and guardians of the young insureds.

It is an object of the present invention to provide a system including a mobile device insurance software application that allows the insured of a property-casualty insurer to interact, in an immediate online mode, with the insurer to access services that the insured needs most, at the time and location when they are needed. The insured can access services with or without the assistance of a representative of the insurer. By way of example, the insured can report an automobile or home loss contemporaneously with and at the location of the loss. In some instances, the insured's reporting can replace the need to send a representative of the insurer, such as a claim investigator, to the location of the loss. As a result, small claims, for instance, can be settled immediately without the expenditure of significant resources.

As another example, an insured can request a 'quick quote' for a new policy, which results in a binder. If the insured accepts the binder, the insured is immediately provided with the agreed upon policy and an auto insurance identification card. Alternatively, an insured can inquire about policy coverages, quotes, billing and claim status.

As another example, at a home closing, an insured can specify a new mortgagee and have a printable insurance identification card, which is proof of insurance, to complete the transaction.

It is an object of the present invention to provide a method and system that connects insureds and insurers so that the insured can select an action button on a touch screen of the mobile device in order to request professional assistance that is specific to the current content of the touch screen display or the location of an accident or loss, and/or to be "tracked" remotely.

It is an object of the present invention to provide a method and system that connects insureds and insurers so that the insured can capture digital images of an insurable vehicle, property or asset and have the images securely archived. The images can be captured pre-loss, for instance, at the time of requesting a quote on a new policy related to the vehicle, property or asset, or post-loss, for instance, to report detailed information relating to the loss.

The method and system of the present invention combines four unique software components along with the features of the smart phone mobile device, data from third party providers and insurance industry standards. The method and system of present invention amalgamates ACORD data structures, wireless communications, digital camera, GPS and vehicle, property and asset data from third party providers of information. Insurance inquiries and transactions that, in known approaches, require written or verbal communications between an insured and an insurer, its agent or both, can be completed without assistance or delay providing an immediate conclusion to the transaction.

Due, in part, to the technical efficiencies and interface of the present invention, the economic benefits to the insurer are significant. The wireless device and its communication link are the financial responsibility of the insured and enable the insured to act in a 'self-service' mode that is intuitive, friendly and uses a widely accepted interface with which the insured is already familiar. Furthermore, the insurer accrues several other benefits, including: reduced customer service costs; reduced payouts on filed claims; increased accuracy of documentation of evidence regarding losses; increased appeal to 'tech savvy', more upwardly-mobile and profitable insureds, as well as other family policy holders; increased insured satisfaction and loyalty; and improved, high-profile market differentiation of the insurer.

According to one embodiment of the present invention, a method for connecting an insured to an insurer is provided. The method includes establishing a communication channel between an insured and an insurer using a mobile insurance module of a mobile device associated with the insured and a server insurance module of a server associated with the insurer, and providing an insurance service across the communication channel.

According to another embodiment of the present invention, a method for providing an insurance service is provided. The method includes receiving, using a server insurance module on a networked server of an insurer, a request for an insurance service from a mobile insurance module on a mobile device; determining, using the server insurance module, whether the request satisfies processing criteria; and, if so, delivering, using the server insurance module, the insurance service to the mobile insurance module on the mobile device.

According to another embodiment of the present invention, a system for connecting an insured to an insurer is provided. The system includes a mobile device associated with an insured having a first processor and a first memory, wherein the first memory has a mobile insurance module stored therein, and a server associated with an insurer having a second processor and a second memory, wherein the second memory has a server insurance module stored therein, wherein the mobile insurance module and the server insurance module interact to perform a method for providing a insurance service.

These and other features of the present invention are described with reference to the drawings of preferred embodiments of a system for connecting an insured with an insurer using a mobile communication device. The illustrated embodiments of the system of the present invention are intended to illustrate, but not limit, the invention.

BRIEF DESCRIPTION OF THE DRAWINGS

FIG. 13 is a flow diagram of a user registration process, according to one embodiment of the present invention.

FIG. 14 is a flow diagram of an asset management process, according to one embodiment of the present invention.

DETAILED DESCRIPTION OF THE PREFERRED EMBODIMENTS

The present invention relates to a system for connecting a prospective or existing policy holder, for instance, an insured, to an insurance company, for instance, an insurer, using a communication network.

Figure 1:
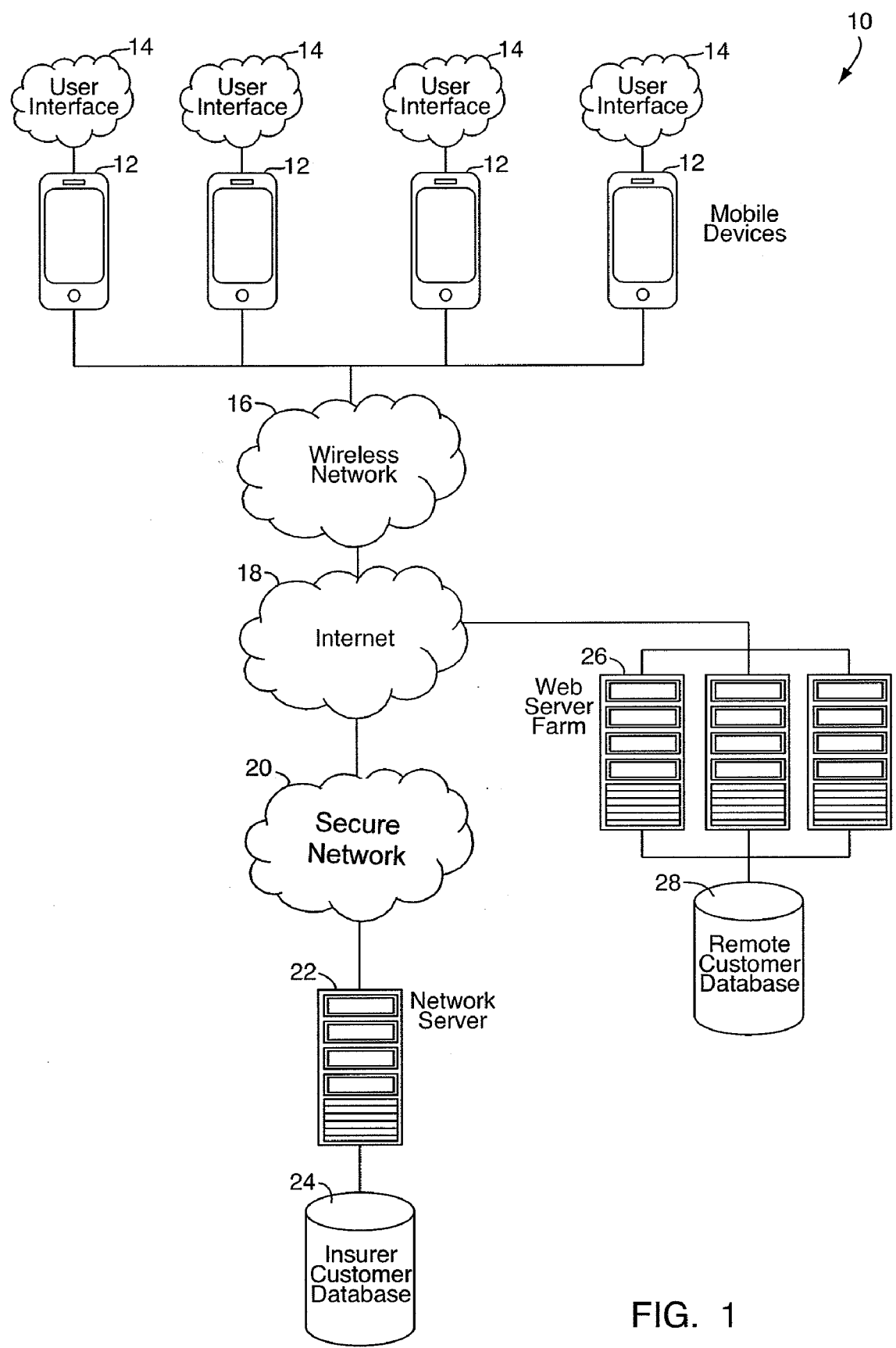
FIG. 1 is a schematic diagram of a communication network including mobile devices, a networked server connected to an insurer customer database and a web server farm connected to a remote customer database, interconnected via the Internet, according to one embodiment of the present invention.

Referring to FIG. 1, a communication network 10 is shown. The communication network 10 includes mobile devices 12 that are owned and/or operated by the insured. The mobile devices 12 are smart phones, such as an Apple iPhone, that include memory in which software is stored, a processor for processing the software and a user interface 14 for allowing the insured to interact with the software. The user interface 14 includes an output device, such as an LCD screen, and an input device, such as a keyboard or a touch screen.

The mobile devices 12 are in wireless communication with a wireless network 16, such as a base station controller, that connects the mobile devices 12 to the Internet 18.

As illustrated in FIG. 1, the Internet 18 is also in communication with a secure network 20 that connects the Internet 18 to a networked server 22 of the insurer. The networked server 22 includes memory in which insurance software, such as insurance models, and insurance data, such as insurer information and data, is stored and a processor for processing the insurance software and insurance data. The networked server 22 is connected to an insurer customer database 24 in which insured information and data, such as customer information and policy information, is stored.

The Internet 18 is also in communication with a web server farm 26 that connects the Internet 18 to a remote customer database 28. The local customer database 28 includes memory in which insured information and data is stored.

Figure 2:
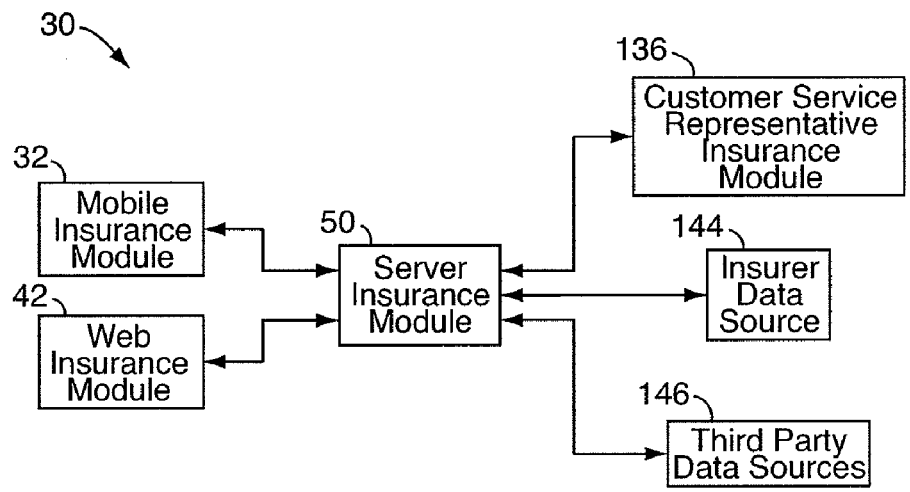
FIG. 2 is a schematic diagram of a communication network including an access terminal of the insured, an access terminal of the insurer, insurer data sources and third party data sources interconnected via a networked server, according to one embodiment of the present invention.
Figure 3:
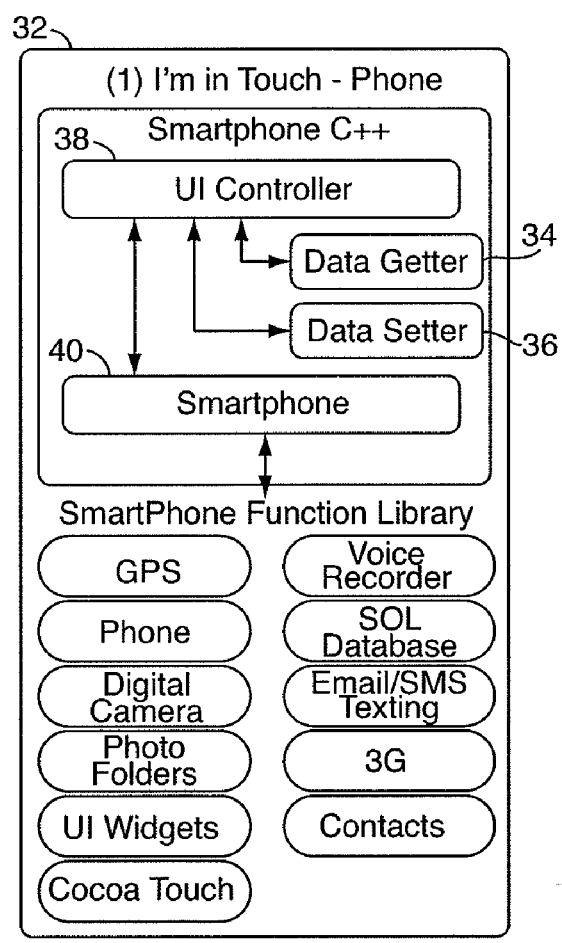
FIG. 3 is a schematic diagram of components of an interface of the mobile device, one of the access terminals of the insured, according to the communication network of FIG. 2.

Referring to FIG. 2, the system 30 of the present invention is shown. Referring additionally to FIG. 3, the system 30 includes a mobile insurance module 32, such as the "I'm in Touch—Phone" Insurance Software module, which is stored in the memory of the mobile device 12 of the insured. Using the mobile insurance module 32, the insured can connect to the insurer. The mobile insurance module 32 is responsible for managing the dialogue between the insured and the insurer to capture data about the insured, a vehicle, property or asset owned or operated by the insured, and an accident or loss relating to the vehicle, property or asset of the insured. For example, the mobile insurance module 32 is capable of performing the following functions:

TABLE 1

Mobile Insurance Module Capabilities

| Function Name | Description |
| --- | --- |
| Quick Quote | Requests a quote for a new policy, including a binder |
| Buy Quote | Accepts the binder provided by the quick quote and substantially immediately produces a printable confirmation and insurance identification card, such as an automobile or home insurance policy card |
| Show Property and Assets | Displays any asset or property for which the insured has requested a quote, purchased a policy or entered related information using the mobile device, as well as other accessible insured data, including the status of a policy associated with the asset or property |
| Show Vehicle | Displays any vehicle for which the insured has requested a quote, purchased a policy or entered related information into the mobile device, as well as other insured data accessible to the insurer, including the status of a policy associated with the vehicle |
| Photo/Record Assets | Activates a record-mode of the camera or video recording feature of the mobile device to capture images of the vehicle, property or asset of the insured |
| Show | Activates a play back mode of the camera or video recording feature of the mobile device to display recently captured images |
| Capture Auto Loss | Activates a record-mode of the camera or video recording feature of the mobile device to capture images of an accident or loss relating to the vehicle of the insured. Once the images are captured, data is automatically gathered to the extent possible and, then, the insured is prompted to enter or correct the data relating to the accident or loss |
| Capture Home Loss | Activates a record-mode of the camera or video recording feature of the mobile device to capture images of an accident or loss relating to the asset or property of the insured; once the images are captured, data is automatically gathered to the extent possible and, then, the insured is prompted to enter or correct the data relating to the accident or loss |
| Track Me | Activates the GPS feature of the mobile device to determine the location of the insured and continues to record the insured's location at approximately 20 second intervals until stopped; the insurer is notified of this activity |
| Assist Me | Activates a voice, text or e-mail mode of the mobile device to initiate a communication between the insured and the insurer during which the insured can request assistance with claim handling, police, towing or other roadside help |

To enable the functions listed in Table 1, the mobile insurance module 32 leverages the capabilities of the smart phone mobile device 12, including: phone mode, voice recorder mode, SMS text mode, e-mail mode, digital camera mode, digital video recording mode, photograph gallery mode, video gallery mode, GPS mode, and other input devices, such as a touch screen, which minimizes the effort to collect, coordinate, administer and manage the desired data. At a database-level, the mobile insurance module 32 leverages the platform on which smart phone mobile devices 12 operate, including SQL databases and 3G-standard resources.

The mobile insurance module 32 also reports information to the insured, for instance, in response to an inquiry or quote request made by the insured. For instance, the mobile insurance module 32 includes a data getter 34 for receiving data from the networked server 22 and a data setter 36 for transmitting data to the networked server 22. The data getter 34 and the data setter 36 are connected to the user interface 14 of the mobile device 12.

In total, the capabilities of the smart phone mobile device 12 enables collection and transmission of all desired and required data relating to an accident or loss at the location of the accident and loss, which, in turn, enables immediate resolution of the claim. This is particularly true for small claims (e.g., the reporting of loss that is below a deductible of the policy), for which limited processing resources are committed to auditing and processing the claim.

The mobile insurance module 32, for example, is installed on the Apple iPhone mobile device 12. Using Apple's proprietary iPhone SDK system (Xcode/Objective C/Cocoa) or the user interface 14, which is a graphical user interface ("GUI"), collects information about the vehicle, property or assets of the insured, losses and new quote information. The mobile insurance module 32 of the present invention utilizes the iPhone's capabilities to communicate to the networked server 22 using HTTP protocol over the communication network 10. Communications are conducted using the industry standard "web services" model. The mobile device 12 also uses the following iPhone Utility Frameworks 40 to provide the mobile insurance module 32 functionalities listed above in Table 1, including: AudioToolbox—Audio recording; CoreFoundation—provides 'C' APIs; CoreGraphics—fundamental to the Mac OS X graphics and windowing environment; CoreLocation—GPS utilization; Foundation—Objective-C classes that provide the infrastructure for object-based applications; OpenGLES—Animation Graphics Library; QuartzCore—supports image processing and video image manipulation; and UIKit—infrastructure needed for creating iPhone applications. The libsqlite3.0.dylib—SQLite Database access library is also utilized to provide the mobile insurance module 32 functionalities listed above in Table 1.

Figure 4:
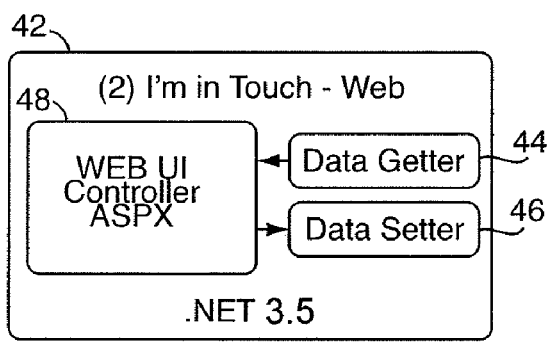
FIG. 4 is a schematic diagram of components of a web-based interface, one of the access terminals of the insured, according to the communication network of FIG. 2.

Referring to FIGS. 2 and 4, the system 30 also includes a web insurance module 42, such as the "I'm in Touch—Web" Insurance Software module, which is accessible on a website using a web browser on the mobile device 12 or a computer. The web insurance module 42 allows the insured to perform many of the functions of the mobile insurance module 32 outside of the mobile insurance module 32 environment. However, the web insurance module 42 can have the following additional functionality:

TABLE 2

Web Insurance Module Capabilities

| Function Name | Description |
| --- | --- |
| Edit Data | Displays a data administration and management tool that enables the insured to import and organize data, including images of the vehicle, property and assets of the insured |
| Review Claim | Displays a claim administration and management tool that enables the insured to review, edit and file claims |
| Request Quote | Requests a quote for a new policy, including a binder, with supplemental capabilities, including insurer's competitors price comparison data, insured's peer coverage comparison data, enhanced or interactive graphics and models, and comprehensive coverage review, analysis and promotional tools |

To enable the functions listed in Table 2, the web insurance module 42 leverages the enhanced capabilities of web browsing in comparison to an application configured for use on the mobile device 12. For instance, the web insurance module 42 facilitates input of data to the system 30 using a full keyboard, a mouse and a large display. However, in some embodiments the web insurance module 42 may exclude some functionalities that have particular synergies with the mobile insurance module 32, for instance, the functionalities that relate to the phone mode, the camera mode, the video recorder mode, the voice recorder mode and the GPS mode of the mobile device 12. Also, provided that the mobile device 12 has sufficient input, processing and display resources, the additional functions of the web insurance module 42 can be included in the mobile insurance module 32.

The web insurance module 42 is provided in a standard HTML interface. The web insurance module 42 includes a data getter 44 for receiving data from the networked server 22 and a data setter 46 for transmitting data to the networked server 22. The data getter 44 and the data setter 46 are connected via a web user interface controller ASPX 46, through which the insured interacts with the system 30. More specifically, the web insurance module 42 accesses the middle tier of the application using industry standard "web services" models with HTTP protocol via Simple Object Access Protocol (SOAP) and Representational State Transfer (RESTful) formats. For example, the web user interface controller ASPX 46 is a web-enabled interface that leverages the Microsoft.NET Framework version 3.5 redistribution package in conjunction with Microsoft Internet Information Server 6.0.

The system 30 also includes a server insurance module 50, such as the "I'm in Touch—Server" Insurance Software module, installed on the networked server 22 and connected to the mobile insurance module 32 and the web insurance module 42. The server insurance module 50 is a primary interactive component of the present invention and includes a number of sub-modules. For instance, the server insurance module 50 includes a database manager sub-module 52. The database manager sub-module 52 is responsible for creating, reading, updating and deleting the application data which includes the profile, vehicle, property, assets, photographs, videos, policies, losses, quotes and contracts data of the insured. For instance, the database manager sub-module 52 is capable of the following functionalities:

TABLE 3

Database Manager Sub-Module Capabilities

| Function Name | Description |
| --- | --- |
| Manage Profile | Administers and manages the profile of the insured |
| Manage Home Loss | Administers and manages a submission relating to a property and/or asset loss of the insured |
| Manage Auto Loss | Administers and manages a submission relating to a vehicle loss of the insured |
| Manage Property | Administers and manages the property or the assets of the insured |
| Manage Quotes | Administers and manages the quotes requested by and provided to the insured |
| Manage Vehicles | Administers and manages the vehicles of the insured |
| Manage Contracts | Administers and manages the contracts of the insured |
| Manage Policy | Administers and manages the policy of the insured |

The database manager sub-module 52 utilizes Microsoft SQL Server Database to implement a related table-based data structure with simple primary key and foreign key structure. Data is stored in the database manager sub-module 52 in a series of related tables providing database normalization and made accessible via a secure user/password methodology over TCP/IP.

Figure 6:
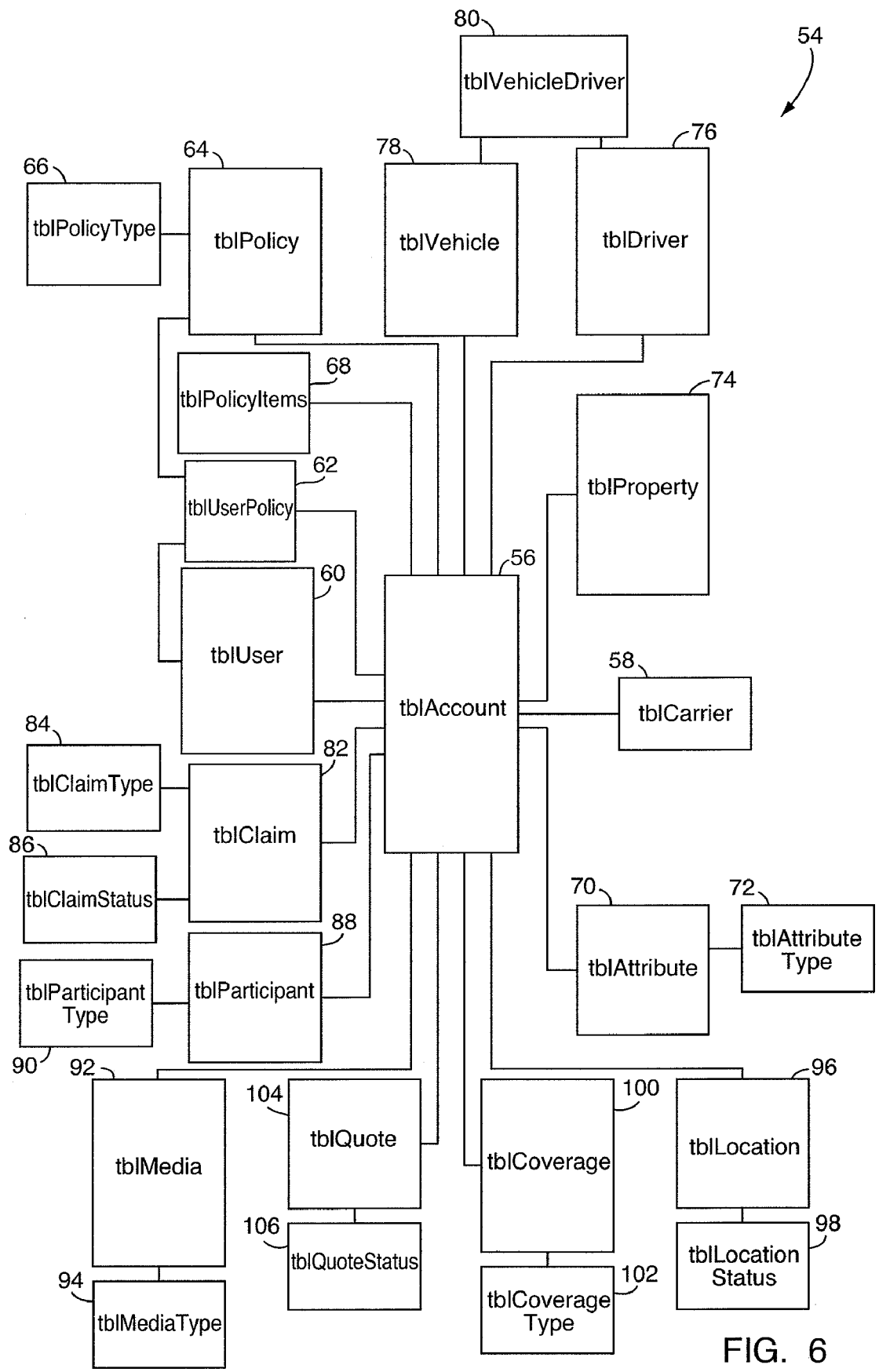
FIG. 6 is a schematic diagram of the structure of a database management sub-module of the networked server of FIG. 5.

Referring to FIG. 6, a database scheme 54 of the database manager sub-module 52 is shown. The database scheme 54 includes an account table 56, a carrier table 58, a user table 60, a user policy table 62, a policy table 64, a policy type table 66, a policy items table 68, an attribute table 70, an attribute type table 72, a property table 74, a driver table 76, a vehicle table 78, a vehicle driver table 80, a claim table 82, a claim type table 84, a claim status table 86, a participant table 88, a participant type table 90, a media table 92, a media type table 94, a location table 96, a location status table 98, a coverage table 100, a coverage type table 102, a quote table 104 and a quote status table 106, which are related as shown in FIG. 6.

The account table 56 holds basic name and address information associated the insured. For instance, the account table 56 includes the following data elements:

TABLE 4

Data Elements of the Account Table

| Data Item | Description | Size and Shape | Source of Values |
|---|---|---|---|
| iAccountID | Unique identifier of an account | Integer | Derived by the system 30 |
| cFirstName | First name of the insured | Alphanumeric Character | |
| cLastName | Last name of the insured | Alphanumeric Character | |
| cMiddleName | Middle Name the insured | Alphanumeric Character | |
| cAddress1 | Address line 1 the insured | Alphanumeric Character | |
| cAddress2 | Address line 2 the insured | Alphanumeric Character | |
| cCity | City of the insured | Alphanumeric Character | |
| cState | State of the insured | Alphanumeric Character | |
| cZip | ZIP code of the insured | Alphanumeric Character | |
| cPhone | Phone number the insured | Alphanumeric Character | |
| iAccountStatus | Status of the account | Integer | Derived by the system 30 |
| dteCreateDate | The date on which the account was created | Date | Derived by the system 30 |
| dteTimeStamp | The time at which the record was created | Date | Derived by the system 30 |

The account table 56 is related to the carrier table 58, the user table 60, the user policy table 62, the policy table 64, the policy type table 66, the policy items table 68, the attribute table 70, the property table 72, the driver table 74, the vehicle driver table 76, the claim table 78, the claim type table 80, the claim status table 82, the participant table 84, the participant type table 84, the media table 88, the media type table 90, the location table 92, the location status table 94, the coverage table 96, the coverage type table 98, the quote table 100 and the quote status table 102.

The carrier table 58 holds a list of the insurers that have registered with the system 30. For instance, the carrier table 58 includes the following data elements:

TABLE 5

Data Elements of the Carrier Table

| Data Item | Description | Size and Shape | Source of Values |
|---|---|---|---|
| iCarrierID | Unique identification of the insurer | Integer | Derived by the system 30 |
| iCarrierName | Description of the name of the insurer | Integer | Derived by the system 30 |

The carrier table 58 is related to the account table 56 and the policy table 64.

The user table 60 holds basic name information about the insured and information that identifies the unique signature of the mobile device 12 of the insured. The recognition of the mobile device 12 as being associated with the insured authenticates access to the system 30 and enables insurance services to be provided to the insured without the insured having to go through an identification process. In addition, by recognizing the insured, data associated with the insured, such as policy, vehicle, property and asset and claim data, can be gathered immediately. For instance, the user table 60 includes the following data elements:

TABLE 6

Data Elements of the User Table

| Data Item | Description | Size and Shape | Source of Values |
|---|---|---|---|
| iAccountID | Unique identifier of an account | Integer | Derived by the system 30 |
| cFirstName | First name of the insured | Alphanumeric Character | |
| cLastName | Last name of the insured | Alphanumeric Character | |
| cMiddleName | Middle name of the insured | Alphanumeric Character | |
| cUserID | Unique identifier the insured | Alphanumeric Character | |
| cPhoneNumber | Phone number of the mobile device of the insured | Alphanumeric Character | |
| cPhoneSerial | Serial number of the mobile device of the insured | Alphanumeric Character | |
| cNickName | Nick name of the insured | Alphanumeric Character | |
| cDriverID | Unique identifier derived by the system to identify each driver associated with the account or policy | Alphanumeric Character | |
| dteTimeStamp | The time at which the record was created | Date | |

The user table 60 is related to the account table 54 and the user policy table 62.

The user policy table 62 holds the relationship between the insured and the policy number associated with the insured. For instance, the user policy table 62 includes the following data elements:

TABLE 7

Data Elements of the User Policy Table

| Data Item | Description | Size and Shape | Source of Values |
|---|---|---|---|
| iAccountID | Unique identifier of the account | Integer | Derived by the system 30 |
| cCarrierPolicyID | Unique identifier of the policy issued by the insurer | Alphanumeric Character | |
| cUserID | Unique identifier of the insured | Alphanumeric Character | |
| iPolicyID | Unique identifier of the policy of the insured | Integer | Derived by the system 30 |
| dteTimeStamp | The time at which the record was created | Date | Derived by the system 30 |

The user policy table 62 is related to the account table 54 and the policy table 66.

The policy table 64 holds high-level policy information provided by the insurer related to the policy identifiers of the system 30. For instance, the policy table 64 includes the following data elements:

TABLE 8

Data Elements of the Policy Table

| Data Item | Description | Size and Shape | Source of Values |
|---|---|---|---|
| iAccountID | Unique identifier of an account | Integer | Derived by the system 30 |
| iCarrierID | Unique identification of the insurer | Integer | Derived by the system 30 |
| cCarrierPolicyID | Unique identifier of the policy issued by the insurer | Alphanumeric Character | |
| iPolicyID | Unique identifier of the policy | Integer | Derived by the system 30 |
| iPolicyType | Indicates the type of policy, e.g., homeowners, automobile, boat and/or assets | Integer | Derived by the system 30 |
| dtePolicyEffectiveDate | The date that the coverage was in force with the insurer | Date | |
| dteTimeStamp | The time at which the record was created | Date | Derived by the system 30 |

The policy table 64 is related to the account table 54, the user table 60 and the policy type table 66.

The policy type table 66 holds a list of valid types of policy. For instance, the policy type table 66 includes the following data elements:

TABLE 9

Data Elements of the Policy Type Table

| Data Item | Description | Size and Shape | Source of Values |
|---|---|---|---|
| iAccountID | Unique identifier of an account | Integer | Derived by the system 30 |
| iCarrierID | Unique identification of the insurer | Integer | Derived by the system 30 |
| iPolicyType | Indicates the type of policy, e.g., homeowners, automobile, boat and/or assets | Integer | Derived by the system 30 |
| cPolicyTypeName | The full policy type description | Alphanumeric Character | |

The policy type table 66 is related to the account table 54 and the policy table 64.

The policy items table 68 holds a list of policy information relating to specific assets of the insured. For instance, the policy items table 68 includes the following data elements:

TABLE 10

Data Elements of the Policy Items Table

| Data Item | Description | Size and Shape | Source of Values |
|---|---|---|---|
| iAccountID | Unique identifier of an account | Integer | Derived by the system 30 |
| cCarrierPolicyID | Unique identifier of the policy issued by the insurer | Alphanumeric Character | |
| iItemID | Unique identifier of the asset | Integer | Derived by the system 30 |
| dteTimeStamp | The time at which the record was created | Date | Derived by the system 30 |

The policy items table 68 is related to the account table 54.

The attribute table 70 holds a list of attribute value pairs that can be used to append the data collection. For instance, the attribute table 70 includes the following data elements:

TABLE 11

Data Elements of the Attribute Table

| Data Item | Description | Size and Shape | Source of Values |
|---|---|---|---|
| iAccountID | Unique identifier of an account | Integer | Derived by the system 30 |
| cCarrierPolicyID | Unique identifier of the policy issued by the insurer | Alphanumeric Character | |
| iItemID | Unique identifier of the asset | Integer | Derived by the system 30 |
| iAttributeType | Describes the type of field represented by attribute value | Integer | Derived by the system 30 |
| cAttributeValue | Field value provided for the attribute type of the asset | Alphanumeric Character | |
| dteTimeStamp | The time at which the record was created | Date | Derived by the system 30 |

The attribute table 70 is related to the account table 54 and the attribute type table 72.

The attribute type table 72 holds a list of valid field types to be represented in the attribute value pair combinations. This table, in particular, varies between insurers. For instance, the attribute type table 72 includes the following data elements:

TABLE 12

Data Elements of the Attribute Type Table

| Data Item | Description | Size and Shape | Source of Values |
|---|---|---|---|
| iCarrierID | Unique identification of the insurer | Integer | Derived by the system 30 |
| iAttributeType | Describes the type of the field represented by attribute value | Integer | Derived by the system 30 |
| cAttributeName | Description of the type of field | Alphanumeric Character | |

The attribute type table 72 is related to the account table 54 and the attribute table 70.

The property table 74 holds the address, including latitude and longitude, of a property. For instance, the property table 74 includes the following data elements:

TABLE 13

Data Elements of the Property Table

| Data Item | Description | Size and Shape | Source of Values |
| --- | --- | --- | --- |
| iAccountID | Unique identifier of the account | Integer | Derived by the system 30 |
| cCarrierPolicyID | Unique identifier of the policy issued by the insurer | Alphanumeric Character | |
| cPropertyID | Unique identifier of the property of the insured | Alphanumeric Character | Derived by the system 30 |
| cAddress1 | Address line 1 of the property of the insured | Alphanumeric Character | |
| cAddress2 | Address line 2 of the property of the insured | Alphanumeric Character | |
| cCity | City of the property of the insured | Alphanumeric Character | |
| cState | State of the property of the insured | Alphanumeric Character | |
| cZip | ZIP code of the property of the insured | Alphanumeric Character | |
| dLat | Latitude of the address of the property of the insured | Decimal | Derived by GPS mode of mobile device 12 or third party data sources 146 |
| dLon | Longitude of the address of the property of the insured | Decimal | Derived by GPS mode of mobile device 12 or third party data sources 146 |
| dteTimeStamp | The time at which the record was created | Date | Derived by the system 30 |

The property table 74 is related to the account table 54.

The driver table 76 holds the address and personal information for each driver. For instance, the driver table 76 includes the following data elements:

TABLE 14

Data Elements of the Driver Table

| Data Item | Description | Size and Shape | Source of Values |
| --- | --- | --- | --- |
| iAccountID | Unique identifier of an account | Integer | Derived by the system 30 |
| cCarrierPolicyID | Unique identifier of the policy issued by the insurer | Alphanumeric Character | |
| cDriverID | Unique identifier of each driver associated with the account or the policy | Alphanumeric Character | |
| cFirstName | First name of the insured | Alphanumeric Character | |
| cLastName | Last name of the insured | Alphanumeric Character | |
| cMiddleName | Middle name of the insured | Alphanumeric Character | |
| cAddress1 | Address line 1 of the insured | Alphanumeric Character | |
| cAddress2 | Address line 2 of the insured | Alphanumeric Character | |
| cCity | City of the insured | Alphanumeric Character | |
| cState | State of the insured | Alphanumeric Character | |
| cZipCode | ZipCode of the insured | Alphanumeric Character | |
| cCountry | Country of the insured primary policy holder | Alphanumeric Character | |
| dteDOB | Date of Birth of the insured | Date | |
| cLicenseID | Unique identifier of the license of the insured | Alphanumeric Character | |

TABLE 14-continued

Data Elements of the Driver Table

| Data Item | Description | Size and Shape | Source of Values |
| --- | --- | --- | --- |
| cLicenseState | State of issuance of the license of the insured | Alphanumeric Character | Derived by GPS mode of mobile device 12 or the third party databases 146 |
| dteTimeStamp | The time at which the record was created | Date | Derived by the system 30 |

The driver table 76 is related to the account table 54 and the vehicle driver table 78.

The vehicle table 78 holds descriptors for a vehicle of the insured. For instance, the vehicle table 78 includes the following data elements:

TABLE 15

Data Elements of the Vehicle Table

| Data Item | Description | Size and Shape | Source of Values |
| --- | --- | --- | --- |
| iAccountID | Unique identifier of the account | Integer | Derived by the system 30 |
| cCarrierPolicyID | Unique identifier of the policy issued by the insurer | Alphanumeric Character | |
| cVehicleID | Unique identifier of the vehicle of the insured | Alphanumeric Character | Derived by the system 30 |
| cVIN | Vehicle Identification Number ("VIN") of the vehicle of the insured | Alphanumeric Character | |
| cMake | Make of the vehicle of the insured | Alphanumeric Character | |
| cModel | Model of the vehicle of the insured | Alphanumeric Character | |
| iYear | Year of the vehicle of the insured | Integer | |
| cColor | Color of the vehicle of the insured | Alphanumeric Character | |
| dteTimeStamp | The time at which the record was created | Date | Derived by the system 30 |

The vehicle table 78 is related to the account table 54 and the vehicle driver table 80.

The vehicle driver table 80 holds data that relates drivers to vehicles and the percentage of use of the vehicle for which each driver is responsible. For instance, the vehicle driver table 80 includes the following data elements:

TABLE 16

Data Elements of the Vehicle Driver Table

| Data Item | Description | Size and Shape | Source of Values |
| --- | --- | --- | --- |
| iVehicleID | Unique identifier of the vehicle of the insured | Integer | Derived by the system 30 |
| cDriverID | Unique identifier of the policy issued by the insurer | Alphanumeric | Derived by the system 30 |
| dteTimeStamp | The time at which the record was created | Date | Derived by the system 30 |
| iPercentUse | Percent of time that a driver used the vehicle as opposed to another vehicle | Integer | |

The vehicle driver table 80 is related to the account table 54, the driver table 76, and the vehicle table 78.

The claim table 82 holds data that relates all the data together for a specific claim. For instance, the claim table 82 includes the following data elements:

TABLE 17

Data Elements of the Claim Table

| Data Item | Description | Size and Shape | Source of Values |
|---|---|---|---|
| iAccountID | Unique identifier of the account of the insured | Integer | Derived by the system 30 |
| cCarrierPolicyID | Unique identifier of the policy issued by the insurer | Alphanumeric Character | |
| cClaimID | Unique identifier of the claim | Alphanumeric Character | Derived by the system 30 |
| iClaimType | Indicates of the type of the claim | Integer | |
| cItemID | Unique identifier of the asset of the insured | Alphanumeric Character | |
| iClaimStatus | Indicates the status of the claim | Integer | |
| dteSubmitClaim | The date the claim was submitted | Date | Derived by the system 30 |
| dteTimeStamp | The time at which the record was created | Date | Derived by the system 30 |

The claim table 82 is related to the account table 54, the claim type table 84 and the claim status table 86.

The claim type table 84 contains a list of claim types and descriptions thereof. The claim type table 84, in particular, varies by insurer. For instance, the claim type table 84 includes the following data elements:

TABLE 18

Data Elements of the Claim Type Table

| Data Item | Description | Size and Shape | Source of Values |
|---|---|---|---|
| iCarrierID | Unique identification of the insurer | Integer | Derived by the system 30 |
| iClaimType | Indicates of the type of the claim | Integer | |
| cClaimTypeName | Description of the type of the claim | Alphanumeric Character | |

The claim type table 84 is related to the account table 54 and the claim table 82.

The claim status table 86 contains a list of claim statuses and their descriptions. The claim status table 86, in particular, varies by insurer. For instance, the claim status table 86 includes the following data elements:

TABLE 19

Data Elements of the Claim Status Table

| Data Item | Description | Size and Shape | Source of Values |
|---|---|---|---|
| iCarrierID | Unique identification of the insurer | Integer | Derived by the system 30 |
| iClaimStatus | Indicates the status of the claim | Integer | |
| cClaimTypeName | Description for the type of the claim | Alphanumeric Character | |

The claim status table 86 is related to the account table 54, the claim table 82.

The participant table 88 contains records about individuals and firms that were involved with a claim, for instance, other drivers, witnesses, investigators, police officers, rescue crews, tow truck operators, repairmen and repair facilities, salesmen and replacement retailers, doctors, and the like. For instance, the participant table 88 includes the following data elements:

TABLE 20

Data Elements of the Participant Table

| Data Item | Description | Size and Shape | Source of Values |
|---|---|---|---|
| iAccountID | Unique identifier of the account of the insured | Integer | Derived by the system 30 |
| cCarrierPolicyID | Unique identifier of the policy issued by the insurer | Alphanumeric Character | |
| cClaimID | Unique identifier of the claim | Alphanumeric Character | Derived by the system 30 |
| cParticipantID | Unique identifier of the participant | Alphanumeric Character | |
| iParticipantTypeID | Identifier of the type of the participant | Integer | |
| dteTimeStamp | The time at which the record was created | Date | Derived by the system 30 |

The participant table 88 is related to the account table 54 and the participant type table 90.

The participant type table 90 contains a list of types of participants. For instance, the participant type table 90 includes the following data elements:

TABLE 21

Data Elements of the Participant Type Table

| Data Item | Description | Size and Shape | Source of Values |
|---|---|---|---|
| iCarrierID | Unique identification of the insurer | Integer | Derived by the system 30 |
| iParticipantTypeID | Identifier of the type of the participant | Integer | |
| cParticipantTypeName | Description for the type of the participant | Alphanumeric Character | |

The participant type table 90 is related to the account table 54 and the participant table 88.

The media table 92 holds metadata records of a media file. For instance, the media table 92 includes the following data elements:

TABLE 22

Data Elements of the Media Table

| Data Item | Description | Size and Shape | Source of Values |
|---|---|---|---|
| iAccountID | Unique identifier of the account of the insured | Integer | Derived by the system 30 |
| cCarrierPolicyID | Unique identifier of the policy issued by the insurer | Alphanumeric Character | |
| cMediaID | Unique identifier of the media file | Alphanumeric Character | Derived by the system 30 |
| cMediaName | Description for the media file | Alphanumeric Character | |
| iMediaType | Identifier of the type of the media | Integer | |
| iItemID | Unique identifier of the asset of the insured about which the media file relates | Integer | |
| iOrder | Identifier of the order in which the media files are displayed | Integer | |
| cMediaFile | File name of the media file | Alphanumeric Character | |
| dteTimeStamp | The time at which the record was created. | Date | Derived by the system 30 |

The media table 92 is related to the account table 54 and the media type table 94.

The media type table 94 holds contains a list of valid Media types. For instance, the media type table 94 includes the following data elements:

TABLE 23

Data Elements of the Media Type Table

| Data Item | Description | Size and Shape | Source of Values |
|---|---|---|---|
| iCarrierID | Unique identification of each insurer that is registered with the system 30 | Integer | Derived by the system 30 |
| iMediaTypeID | Identifier of the type of the media | Integer | |
| cMediaTypeName | Description for the type of the media | Alphanumeric Character | |

The media type table 94 is related to the account table 54 and the media table 92.

The location table 96 holds geographic latitude and longitude records that can be associated with a media file and/or a claim record. For instance, the location table 96 includes the following data elements:

TABLE 24

Data Elements of the Location Table

| Data Item | Description | Size and Shape | Source of Values |
|---|---|---|---|
| iAccountID | Unique identifier of the account of the insured | Integer | Derived by the system 30 |
| cUserID | Unique Identifier of the insured | Alphanumeric Character | Derived by the system 30 |
| cClaimID | Unique identifier of the claim | Alphanumeric Character | Derived by the system 30 |
| dLat | Latitude of the location of the media file or the claim | Decimal | Derived by the GPS mode of the mobile device 12 or from the third party data sources 146 |
| dLon | Longitude of the location of the media file or the claim | Decimal | Derived by the GPS mode of the mobile device 12 or from the third party data sources 146 |
| iLocationStatus | Identifier of the status of the location | Integer | Derived by the system 30 |
| dteTimeStamp | The time at which the record was created | Date | Derived by the system 30 |

The location table 96 is related to the account table 54 and the location status table 98.

The location status table 98 holds a list of valid location statuses, which, in particular, varies by insurer. For instance, the location status table 98 includes the following data elements:

TABLE 25

Data Elements of the Location Status Table

| Data Item | Description | Size and Shape | Source of Values |
|---|---|---|---|
| iCarrierID | Unique identification of the insurer | Integer | Derived by the system 30 |
| iLocationStatus | Identifier of the status of the location | Integer | Derived by the system 30 |
| cLocationStatusName | Description for the status of the location | Alphanumeric Character | |

The location status table 98 is related to the account table 54 and the location table 96.

The coverage table 100 holds records of coverages associated with the policy of the insured. For instance, the coverage table 100 includes the following data elements:

TABLE 26

Data Elements of the Coverage Table

| Data Item | Description | Size and Shape | Source of Values |
|---|---|---|---|
| iAccountID | Unique identifier of the account of the insured | Integer | Derived by the system 30 |
| cCarrierPolicyID | Unique identifier of the policy issued by the insurer | Alphanumeric Character | |
| cCoveredItemID | Unique identifier of the item associated with the policy of the insured | Alphanumeric Character | Derived by the system 30 |
| iCoverageType | Identifier of the type of coverage | Integer | |
| iCoverageAmount | Value of the amount of the coverage as a percentage | Integer | |
| dPremium | Value of the premium paid for the policy of the insured | Decimal | |
| dCoverageLimit | Value of the coverage limits of the policy of the insured | Decimal | |
| dCoverageDeductible | Value of the deductible of the coverage of the policy of the insured | Decimal | |

TABLE 26-continued

Data Elements of the Coverage Table

| Data Item | Description | Size and Shape | Source of Values |
|---|---|---|---|
| dteTimeStamp | The time at which the record was created | Date | Derived by the system 30 |

The coverage table 100 is related to the account table 54 and the coverage type table 102.

The coverage type table 102 holds a list of types of coverage. For instance, the coverage type table 102 includes the following data elements:

TABLE 27

Data Elements of the Coverage Type Table

| Data Item | Description | Size and Shape | Source of Values |
|---|---|---|---|
| iCarrierID | Unique identification of the insurer | Integer | Derived by the system 30 |
| iCoverageType | Identifier of the type of the coverage of the policy of the insured | Integer | Derived by the system 30 |
| cCoverageTypeName | Description for a type of the coverage of the policy of the insured | Alphanumeric Character | |

The coverage type table 102 is related to the account table 54 and the coverage table 100.

The quote table 104 holds records of each quote requested and issued. For instance, the quote table 104 includes the following data elements:

TABLE 28

Data Elements of the Quote Table

| Data Item | Description | Size and Shape | Source of Values |
|---|---|---|---|
| iAccountID | Unique identifier of the account of the insured | Integer | Derived by the system 30 |
| cCarrierPolicyID | Unique identifier of the policy issued by the insurer | Alphanumeric Character | |
| cVehicleID | Unique identifier of the vehicle of the insured | Alphanumeric Character | Derived by the system 30 |
| iQuoteStatus | Identifier of the status of the quote submitted to the insurer | Integer | |
| dteSubmitDate | The date on which the quote was submitted to the insurer | Date | |
| dteTimeStamp | The time at which the record was created | Date | Derived by the system 30 |

The quote table 104 is related to the account table 54 and the quote status table 106.

The quote status table 106 holds a list of valid quote statuses. For instance, the quote status table 106 includes the following data elements:

TABLE 29

Data Elements of the Quote Status Table

| Data Item | Description | Size and Shape | Source of Values |
|---|---|---|---|
| iCarrierID | Unique identification of the insurer | Integer | Derived by the system 30 |
| iQuoteStatus | Identifier of the status of the quote submitted to the insurer | Integer | Derived by the system 30 |
| cQuoteStatusName | Description for the status of the quote submitted to the insurer | Alphanumeric Character | |

The quote status table 106 is related to the account table 54 and the quote table 104.

The server insurance module 50 includes a transaction manager sub-module 108 that connects the server insurance module 50 to the mobile insurance module 32 and the web insurance module 42 associated with the insured. The transaction manager sub-module 108 is responsible for managing the workflows that drive the primary application functions such as registering an insured, generating a quote, buying a policy, requesting assistance and submitting a loss. For instance, the transaction manager sub-module 108 is capable of the following functionalities:

TABLE 30

Transaction Manager Sub-Module Capabilities

| Function Name | Description |
|---|---|
| Registration | Registers the insured with the system |
| Message Composer | Composes messages to transmit to the various components of the system and reformats the message to integrate with programs and databases outside of the system |
| Initiate Assist | Initiates a telephone, text or e-mail communication between the insurer and the insured for assisting the insured and requests an investigator of the insurer to initiate a claim handling proceeding |
| Get Quote | Processes the information provided by the requesting insured and generates a quote based on the models and schedules of the insurer |
| Record Contract | Process and record a contract |
| Bind Quote | Process and issue a quote accepted by the insured for review by an underwriter of the insurer |
| Record Auto Loss | Process and record a submission relating to a vehicle loss |
| Record Home Loss | Process and record a submission relating to a property and/or asset loss |

Figure 7A:
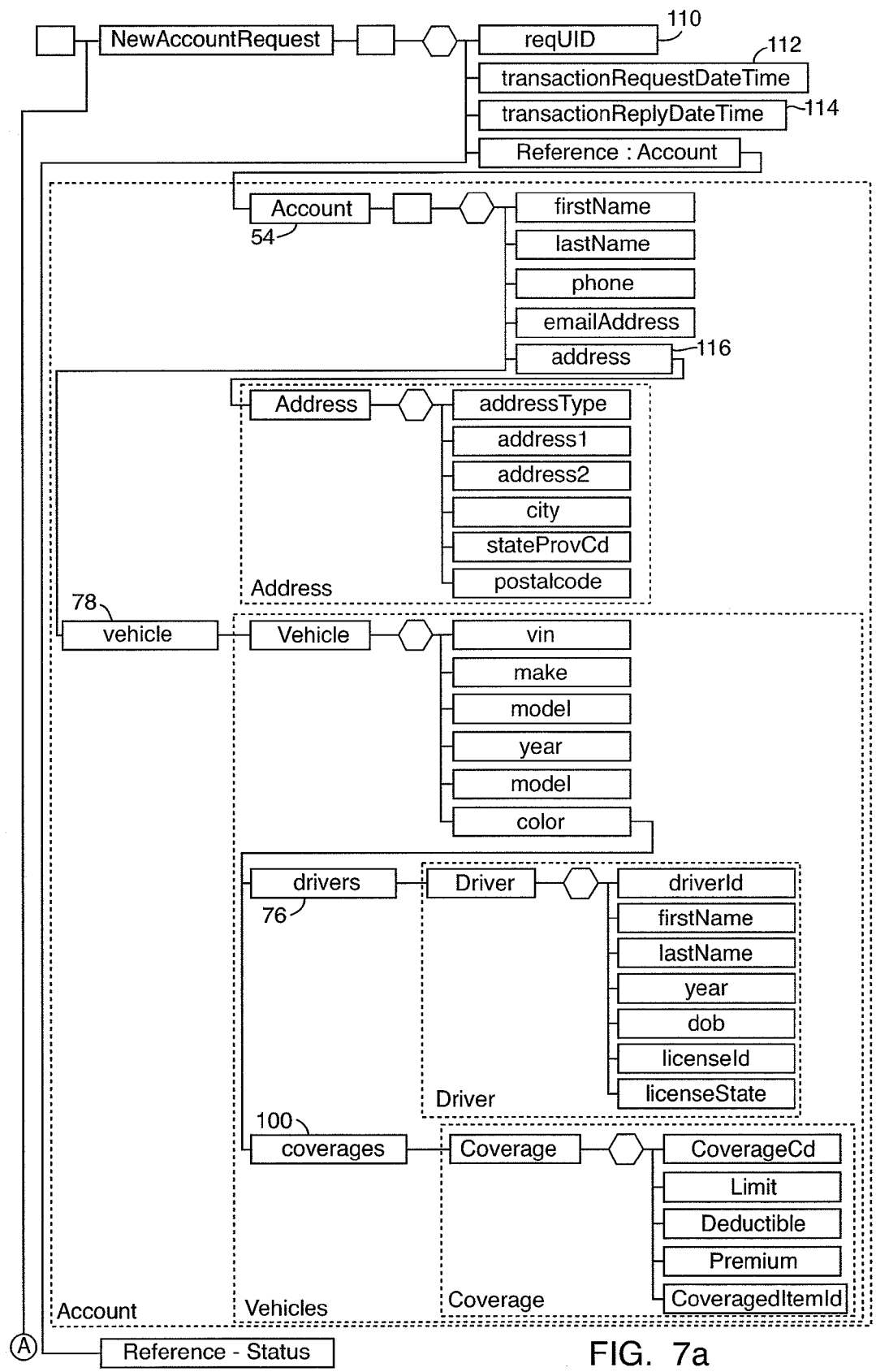
FIGS. 7a and 7b are schematic diagrams of a web service interface for establishing an account with the communication network, according to the networked server of FIG. 5.
Figures 7, 7A, 7B:
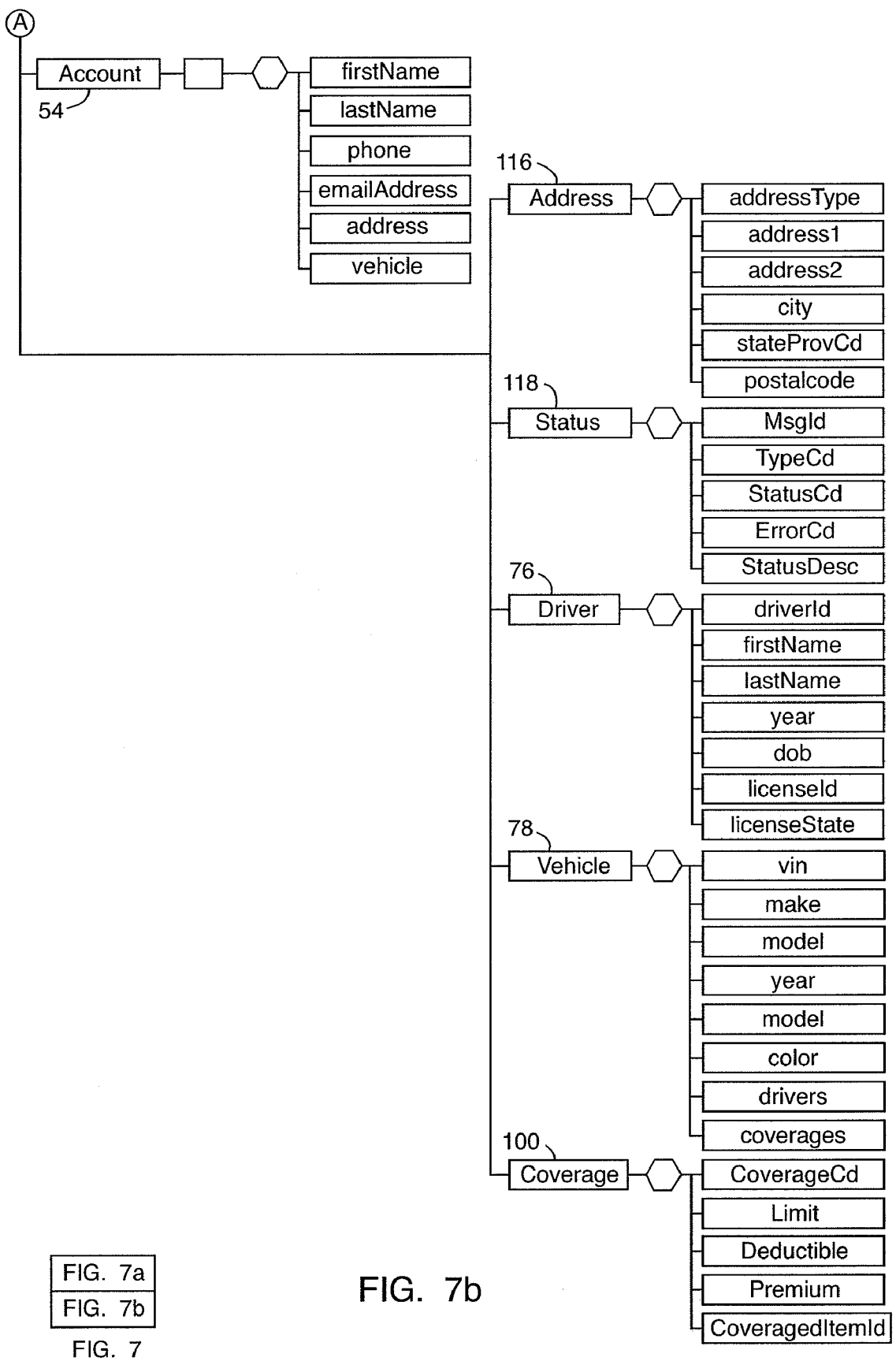

To achieve the above-listed capabilities, the transaction manager sub-module 108 makes calls to the database manager sub-module 52. Referring to FIGS. 7a-7b, a hierarchy of the database manager sub-module 52 tables that are accessed to register a new account with the system 30 is illustrated. For instance, the transaction manager sub-module 108 makes calls to the account table 54 in addition to performing some initial administrative requests, including requesting the generation of a user identification number 110 (cUserID) and a transaction request date stamp 112 (dteDateStamp) and allocating space in memory for a transaction reply date stamp 114 (dteDateStamp), an address table 116 and a status table 118. The address table 116 holds data elements including a type of address (cAddressType), a first line of the address (cAddress1), a second line of the address (cAddress2), a city of the address (cCity), a state or province code (cStateProvCd) and a postal code (cPostalCode). The status table 118 includes a message identification number (cMsgID), a type of the request code (cTypeCd), a status of the registration code (cStatusCd), a description of the status of the registration code (cStatusDesc) and an error code (cErrorCd). In entering and generating the account table 54 data, the transaction manager sub-module 108 makes alls to the account table 54, which in turn makes calls to the vehicle table 78, the driver table 76 and the coverage table 100, and to the status table 116, which in turn makes calls to the account table 54, the address table 116, the driver table 76, the vehicle table 78 and the coverage table 100. Upon receiving or generating the required data for the tables listed-above, the transaction manager sub-module 108 completes the request for registration of the new user and commences the process of replying to the request for registration.

Figure 8:
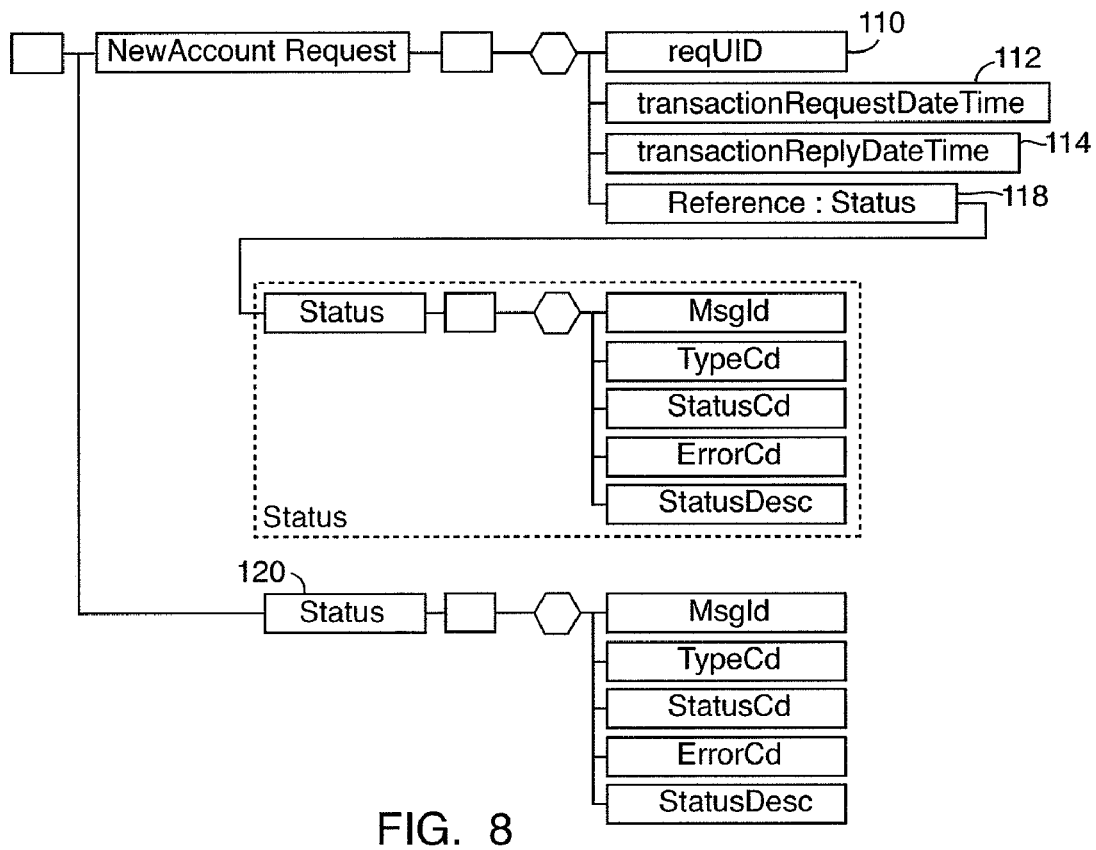
FIG. 8 is a schematic diagram of a web service interface for replying to a request for establishing account with the communication network, according to the networked server of FIG. 5.

Referring to FIG. 8, a hierarchy of the database manager sub-module 52 tables that are accessed in replying to the request for registration with the system 30 is illustrated. For instance, the transaction manager sub-module 108 makes calls to the status table 118 of the request for registration in addition to performing some initial administrative requests, including referencing the user identification number 110 (cUserID) and the transaction request date stamp 112 (dteDateStamp) and generating the transaction reply date stamp 114 (dteDateStamp). The transaction manager sub-module 108 also allocates space in memory for another status table 120, which holds the same data elements as the status table 118.

Figure 9A:
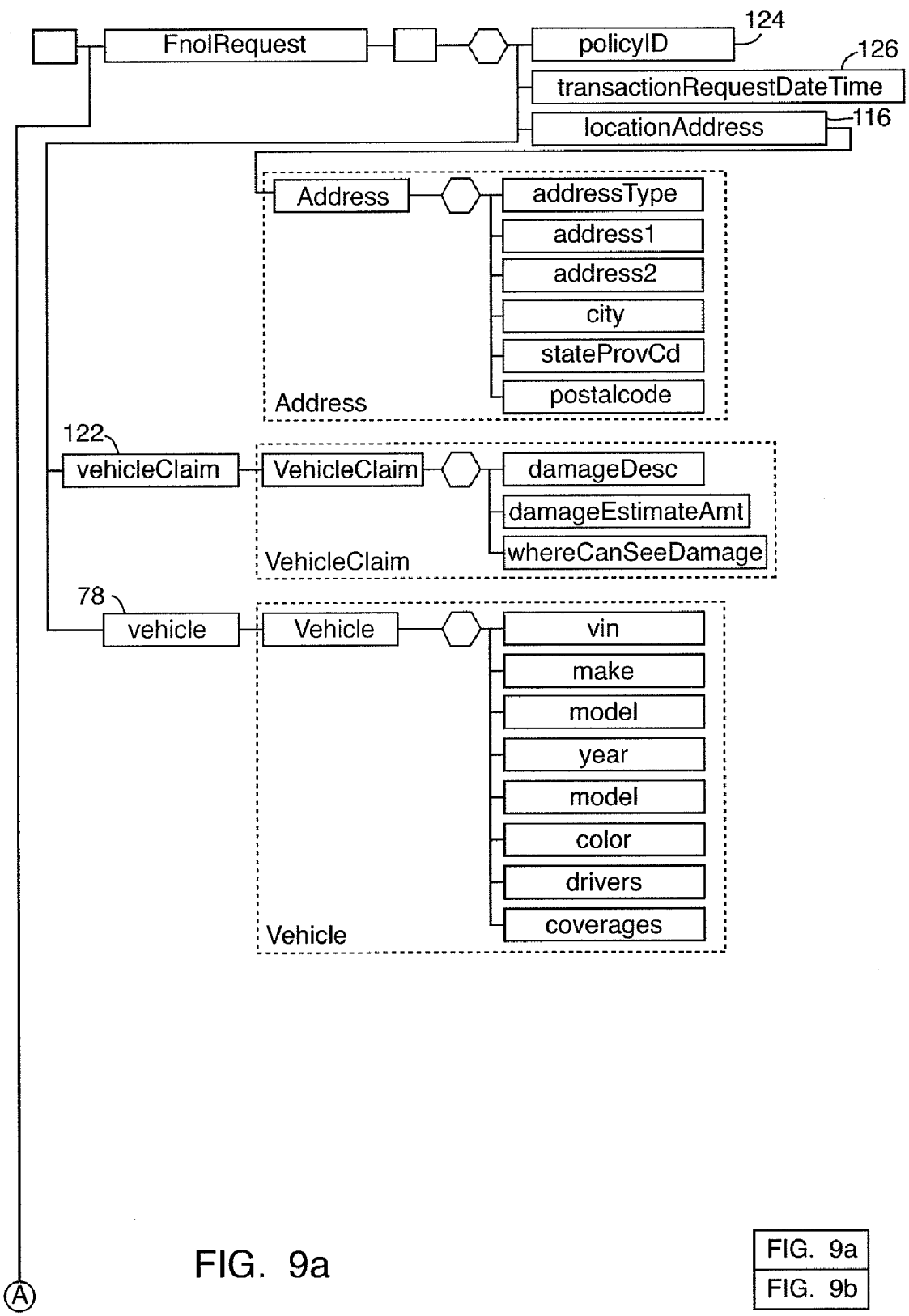
FIGS. 9a and 9b are schematic diagrams of a web service interface for submitting a first notice of loss ("FNOL") to the insurer using the communication network, according to the networked server of FIG. 5.
Figure 9B:
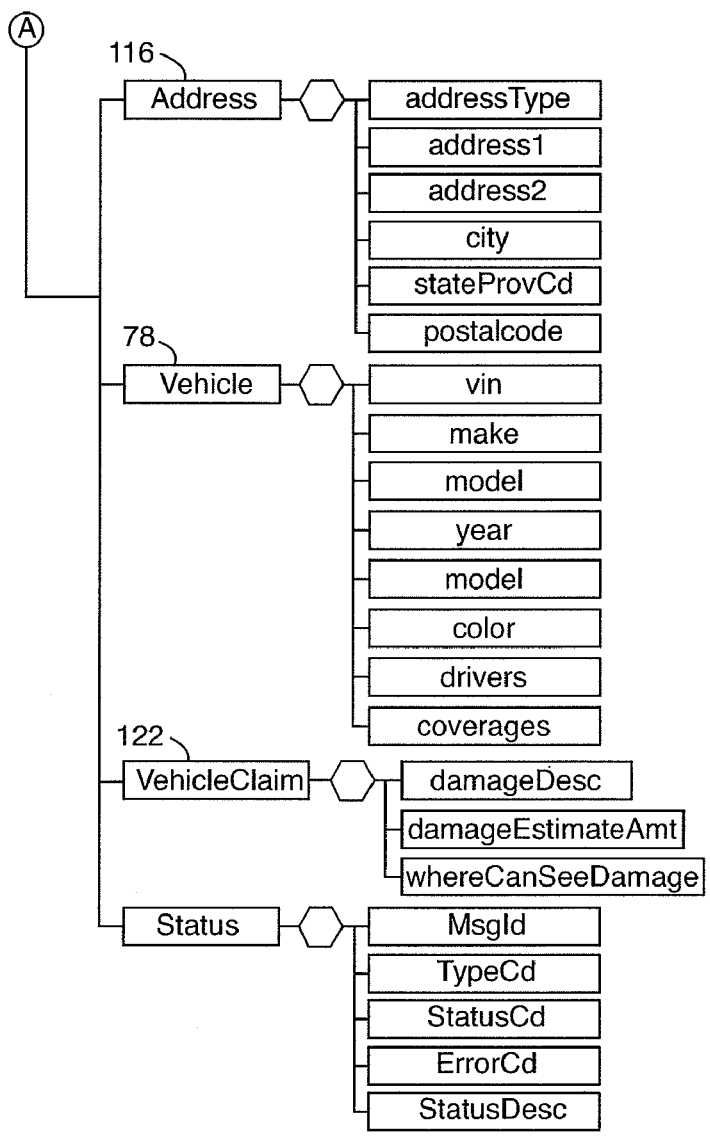

Referring to FIG. 9, a hierarchy of the database manager sub-module 52 tables that are accessed in submitting a first notice of loss ("FNOL") to the system 30 is illustrated. For instance, the transaction manager sub-module 108 makes calls to the address table 116 and the vehicle table 78, and allocates space in memory for a vehicle claim 122 table, which holds data relating to a description of damage to the vehicle (cDamageDesc), an estimated amount of the damage (cDamageEstimateAmt) and a description of where the damage can be seen on the vehicle (cWhereCanSeeDamage). The transaction manager sub-module 108 also references the policy number of the user 124 (cPolicyID), generates a transaction request date stamp 126 (dteTransactionRequestDateTime) and allocates space in memory for another status table 128, which holds the same data elements as status table 116.

Figure 10:
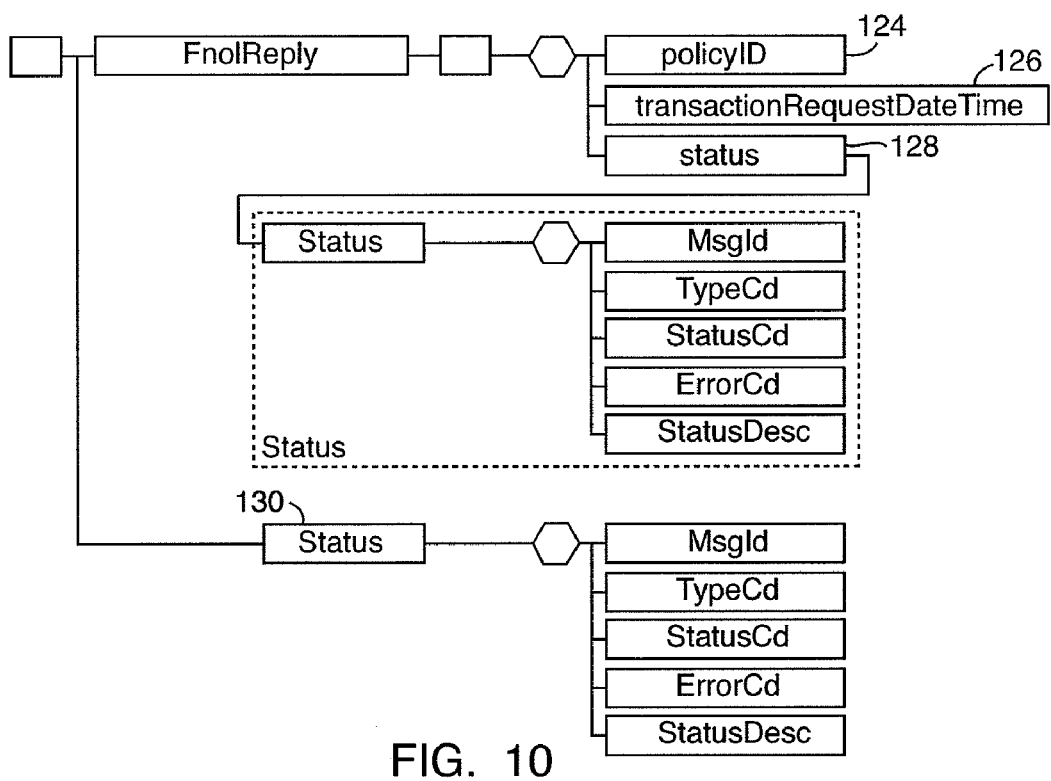
FIG. 10 is a schematic diagram of a web service interface for responding to the submission of the first notice of loss ("FNOL") to the insurer using the communication network, according to the networked server of FIG. 5.

Referring to FIG. 10, a hierarchy of the database manager sub-module 52 tables that are accessed in replying to the submitted first notice of loss ("FNOL") to the system 30 is illustrated. For instance, the transaction manager sub-module 108 references the status table 128 of the submitted first notice of loss and performs initial administrative requests, including referencing the policy number of the user 124 (cPolicyID) and the transaction request date stamp 126 (dteTransactionRequestDateTime) and allocating space in memory for another status table 130, which holds the same data elements as status table 116, for the reply to the submitted first notice of loss.

The user interface 14 of the insured or the insurer mirrors the data structure of the hierarchies illustrated in FIGS. 7-10. For example, each table can be displayed in a common data panel and, more particularly, on a tab specific to each table.

The transaction manager sub-module 108 leverages the Microsoft.NET Framework version 3.5 redistribution package and utilizes SOAP Basic Authentication.

Figure 5:
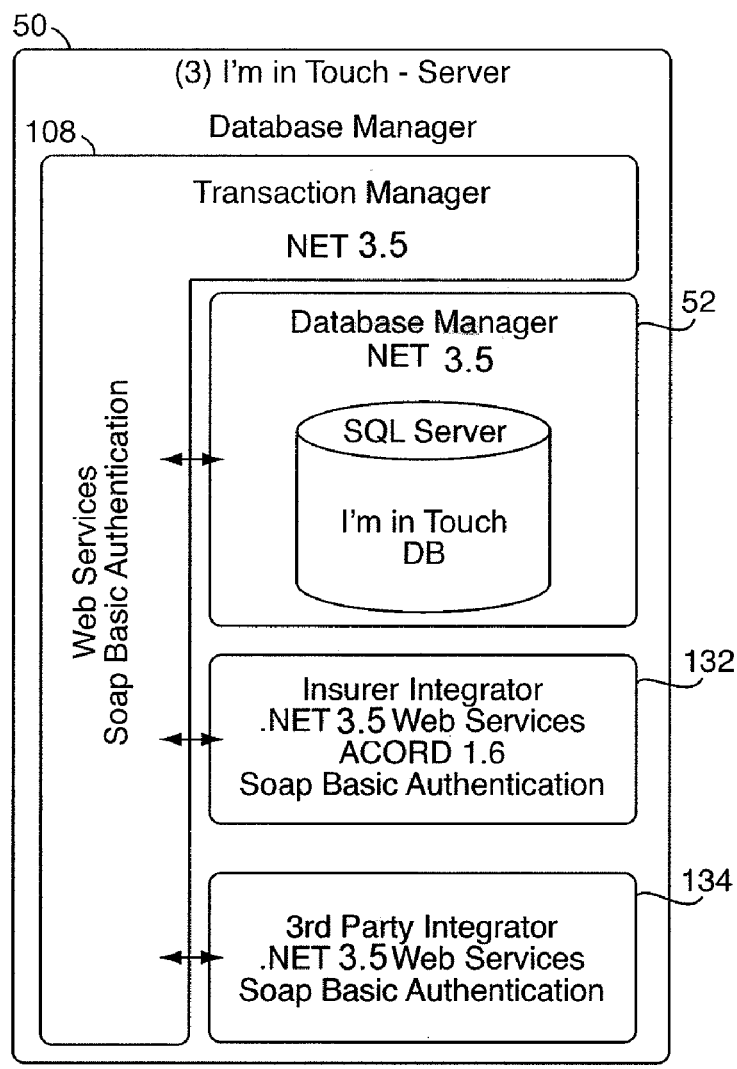
FIG. 5 is a schematic diagram of components of the networked server, according to the communication network of FIG. 2.

Referring to FIG. 5, the server insurance module 50 includes an insurer integrator sub-module 132. The insurer integrator sub-module 132 is responsible for connecting the server insurance module 50 to the insurer, requesting and receiving policy or claim data from databases of the insurer, translating the response into a format that integrates with the system 30, making calls to the database manager sub-module 52 to store the data and formatting the response to the insurer. For instance, the insurer integrator sub-module 132 is capable of the following functionalities:

TABLE 31

Insurer Integrator Sub-Module Capabilities

| Function Name | Description |
| --- | --- |
| Import Policy Data | Imports policy data from the database of the insurer and translates the policy data into a format that integrates with the system |
| Import Claim Data | Imports claim data from the database of the insurer and translates the claim data into a format that integrates with the system |

The insurer integrator sub-module 132 provides all of the processing required to interchange data with insurer. The data format of the interchanged data may be ACORD using XML, a proprietary ASCII format or a mixture of both.

Requests for data made by the insured are either responded to in full, substantially immediately, or are acknowledged with a return receipt if review by an agent is required. The applications source of data for transmission and repository for received data is a SQL database of the system 30. All activity is logged for auditing and recovery.

The insurer integrator sub-module 132 leverages the Microsoft.NET Framework version 3.5 redistribution package in conjunction with ACORD 1.6, and utilizes SOAP Basic Authentication.

The server insurance module 50 includes a third party integrator sub-module 134. The third party integrator sub-module 134 is responsible for connecting to third party data and service providers, translating the response into a format that integrates with the system 30 and calling the database manager sub-module 52 to store the data. For instance, the third party integrator sub-module 134 is capable of the following functionalities:

TABLE 32

Third Party Integrator Sub-Module Capabilities

| Function Name | Description |
| --- | --- |
| Import Satellite Photo Street Map Detail | Imports street map detail data from a third party data source 146 and translates the data into a format that integrates with the system |
| Retrieve Auto Replacement Cost | Imports vehicle repair and replacement cost data from a third party source and translates the data into a format that integrates with the system |
| Import VIN and CarFax Search Results | Imports vehicle identification number, CarFax and or other vehicle data from a third party source and translates the data into a format that integrates with the system |
| Retrieve Home Repair/Replacement Cost | Imports property and/or asset repair and replacement cost data from a third party source and translates the data into a format that integrates with the system |

The third party integrator sub-module 134 utilizes data and services provided by third parties via a web service interface. The additional third party services are accessed via HTTP protocol using the industry standard "web services" model using SOAP and RESTful formats. In particular, the third party integrator sub-module 134 leverages the Microsoft-.NET Framework version 3.5 redistribution package and utilizes SOAP Basic Authentication. Third party service data calls are made both synchronously and asynchronously.

Figure 11:
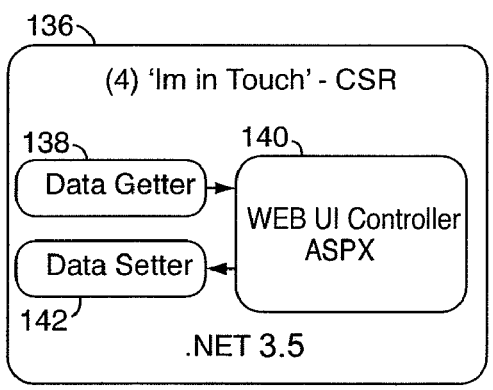
FIG. 11 is a schematic diagram of components of an access terminal of the insurer, such as the station of an agent of the insurer, according to the communication network of FIG. 2.

Referring to FIGS. 2 and 11, the system 30 also includes a customer service representative insurance module 136, such as the "I'm in Touch—Customer Service Representative" Insurance Software module, connected to the transaction management sub-module 108 of the server insurance module 50. The customer service representative insurance module 136 is a web-based application that enables the agents of the insurer to interact with the system 30 and, in particular, to view or update data, close contracts, assist in the completion of a quote or claim or otherwise service the needs of the insured. For instance, the customer service representative insurance module 136 is capable of the following functionalities:

TABLE 33

Customer Service Representative Insurance Module Capabilities

| Function Name | Description |
| --- | --- |
| Manage Assets | Administers and manages the assets, property and vehicles of the insured |

TABLE 33-continued

Customer Service Representative Insurance Module Capabilities

| Function Name | Description |
| --- | --- |
| Manage Contract | Administers and manages policy, coverage, quote and contract, data of the insured |
| Manage Auto Loss | Administers and manages data relating to a vehicle accident or loss |
| Manage Home Loss | Administers and manages data relating to a property and/or assets accident or loss |
| Register Customer Service Representative | Registers and manages authorization levels of an agent of the insurer with the system |
| Search, View and Edit Data | Administers and manages data associated with the insured to correct errors or supplement the information provided, including the photographs, videos, voice recordings and text of the data |

The customer service representative insurance module 136 is a secured terminal. The agent of the insurer must be authenticated before the customer service representative insurance module 136 can access data, such as account data, of the insured stored in the database manager sub-module 52.

Referring to FIG. 11, the customer service representative insurance module 136 includes a data getter 138 that receives data from the server insurance module 50, a web user interface controller ASPX 140 with which the agent of the insurer interacts, and a data setter 142 that transmits data to the server insurance module 50. The web user interface controller ASPX 140 is a web enabled interface that leverages the Microsoft.NET Framework version 3.5 redistribution package using SOAP Basic Authentication.

Referring to FIG. 2, an insurer data source 144 is connected to the insurer integrator sub-module 132 of the server insurance module 50 and serves as a primary repository for insurer data. For instance, the insurer data source 144 includes an insurer customer database containing information relating to the insureds including home loss; auto loss; policy download; bind; and quote request information, as well as an archive of telephone, text and e-mail correspondence.

Figure 12:
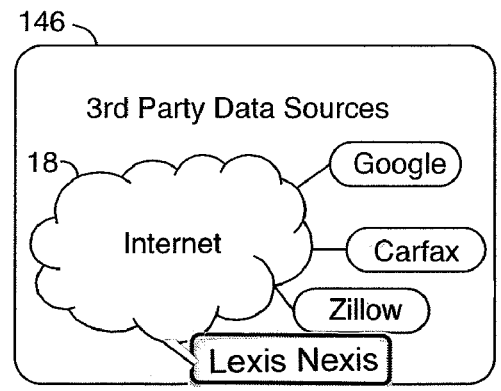
FIG. 12 is a schematic diagram of components of the third party data sources according to the communication network of FIG. 2.

Referring to FIGS. 2 and 12, third party data sources 146, such as Google, CarFax, Motor Trend, Kelley Blue Book, Lexis-Nexis and Zillow, are connected to the third party integrator sub-module 134 of the server insurance module 50 via the Internet 18. The third party data sources 146 provide data and services to the system 30, including vehicle identification number ("VIN") lookups and validations, vehicle history reports, vehicle valuations, property valuations, property replacement values, map data and a superimposition of accident and loss data onto the map data, that are accessible via HTTP using SOAP Basic Authentication and RESTful formats.

Referring to FIG. 13, a process of registering an insured with the system 30 is shown at 150. The mobile device 12 receives (step 152) a selection from the insured to initiate the mobile insurance module 32. The mobile device 12, while booting the mobile insurance module 32, displays (step 154) a splash screen, for instance, featuring the text "Loading . . .". Then, either automatically upon the first activation of the mobile insurance module or upon the receipt of a selection from the insured of the registration process, the mobile insurance module 32 transmits (step 156) a request to the server insurance module 50 for a personal identification number ("PIN"), such as cUserID. Upon receiving (step 158) the PIN, the mobile insurance module 32 solicits (step 160) information from the insured including a nickname, contact name and phone number and other contact information. If the information is acceptable, the mobile insurance module 32 instructs the insured to capture (step 162), using the mobile device 12, a photograph for use as a thumbnail used to identify the insured. Upon receiving a captured photograph, the mobile insurance module 32 determines whether the photograph is acceptable. Then, once the mobile insurance module 32 receives a request to submit the registration from the insured, the mobile insurance module 32 submits (step 164) the information and the photograph to the server insurance module 50. Having transmitted the information and the photograph to the server insurance module 50 related to the insured, the registration process 150 is complete (step 166).

The insured may then purchase a policy using the mobile insurance module 32 or register an existing policy by submitting the policy number (cPolicyID) to the mobile insurance module 32 for validation or by requesting an automatic search and identification of policies associated with the insured.

Referring to FIG. 14, a process of administering and managing insurance coverage for the vehicle of the insured with the system 30 is illustrated at 170. First, the mobile insurance module 32 receives (step 172) a selection from the insured using the mobile device 12 of a vehicle administration option from a master directory of the mobile insurance module 32. In response, the mobile insurance module 32 displays (step 174) a listing of currently registered vehicles of the insured, including vehicle data, and a number of action buttons, including buttons to initiate a quick quote (step 176), initiate a new claim (step 178), review policy coverages (step 180), review photographs (step 182) and display an Insurance Identification Card. If the mobile insurance module 32 receives (step 176) a selection to initiate the quick quote, the mobile insurance module 32 solicits information from the insured, for instance, the vehicle identification number of the vehicle for which the quick quote is requested. The vehicle identification number may be provided by the insured by entering the vehicle identification number in text format or by taking a picture of the vehicle identification number (e.g., from the car window or from inside the driver-side door) that is processed using optical character recognition software to extract the vehicle identification number. Then, the mobile insurance module 32 submits (step 184) a quick quote request to the server insurance module 50. In response, the third party integrator sub-module 134 of the server insurance module 50 requests (step 186) data, such as the make, model and year of the vehicle, associated with the vehicle identification number from third party data sources 146. Upon receiving the vehicle identification number of the vehicle of the insured, the server insurance module 50 formats an ACORD Request For Auto Quotation and submits the request to the insurer (step 188). The insurer computes a quote based, in part, on the received vehicle identification number and currently in-place coverages and deductibles and sends (step 190) the quote to the insured for review in the form of a binder. Upon receiving (step 192) the acceptance of the binder by the insured, the server insurance module 50 generates (step 194) an insurance identification card that is stored on the mobile device 12 and which can be printed immediately as proof of insurance.

If the mobile insurance module 32 receives (step 178) a selection to initiate the new claim, the mobile insurance module 32 solicits (step 196) information from the insured regarding the accident or the loss associated with the claim and, in particular, as the accident or the loss relates to the vehicle of the insured. Upon entering the information about the vehicle of the insured, the insured can choose to enter additional information. If the mobile insurance module 32 receives a selection regarding other vehicles, other damage (i.e., to property, assets and/or individuals) or witnesses, the mobile insurance module 32 solicits additional information regarding the other vehicles (step 198), the other damage (step 200) or the witnesses (step 202). Then, if the mobile insurance module 32 receives a selection by the insured to supplement the provided information, the mobile insurance module 32 instructs the insured to capture (step 204) photographs, video recordings, audio recordings and text notes using the various components of the mobile device 12. By leveraging the technological capabilities of the mobile device 12, the mobile insurance module 32 can capture all relevant information to the processing and resolution of the claim. Once the mobile insurance module 32 receives a request to submit the claim, the mobile insurance module 32 issues an ACORD format First Notice Of Loss or Notice Of Loss (FNL) to the insurer (step 206) the claim, including all relevant information, to the insurer for processing. Then, the mobile insurance module 32 displays (step 208) the claim status to notify the insured of whether the claim is pending or if the claim has been accepted or denied. Since the mobile insurance module 32 has captured and submitted all relevant information concerning the claim at the time of the accident or loss to the insurer in ACORD format and notified claim personnel, the insurer can process and resolve the claim substantially immediately, for instance, while the insured is still on location. For example, the insurer can instruct the insured to provide additional information or the insurer can make a direct deposit to a bank account of the insured substantially immediately, using the insurance module 50.

If the mobile insurance module 32 receives (step 180) a selection to review coverages, the mobile insurance module 32 displays a listing of policies held by the insured and a number of action buttons. Upon receiving a selection by the insured to view additional detail regarding a specific policy, the mobile insurance module 32 displays (step 210) the additional detail. Upon receiving a selection by the insured to view additional detail regarding aggregate coverage of all policies, the mobile insurance module 32 displays (step 212) the additional detail.

If the mobile insurance module 32 receives (step 182) a selection to review photographs, the mobile insurance module 32 displays photographs taken by the insured in thumbnail format. Upon receiving a selection by the insured of a photograph, the mobile insurance module 32 edits (step 214) the metadata of the photographs, for instance, to provide descriptive titles, to add a note or to rearrange the order of the photographs.

Figures 15, 16:
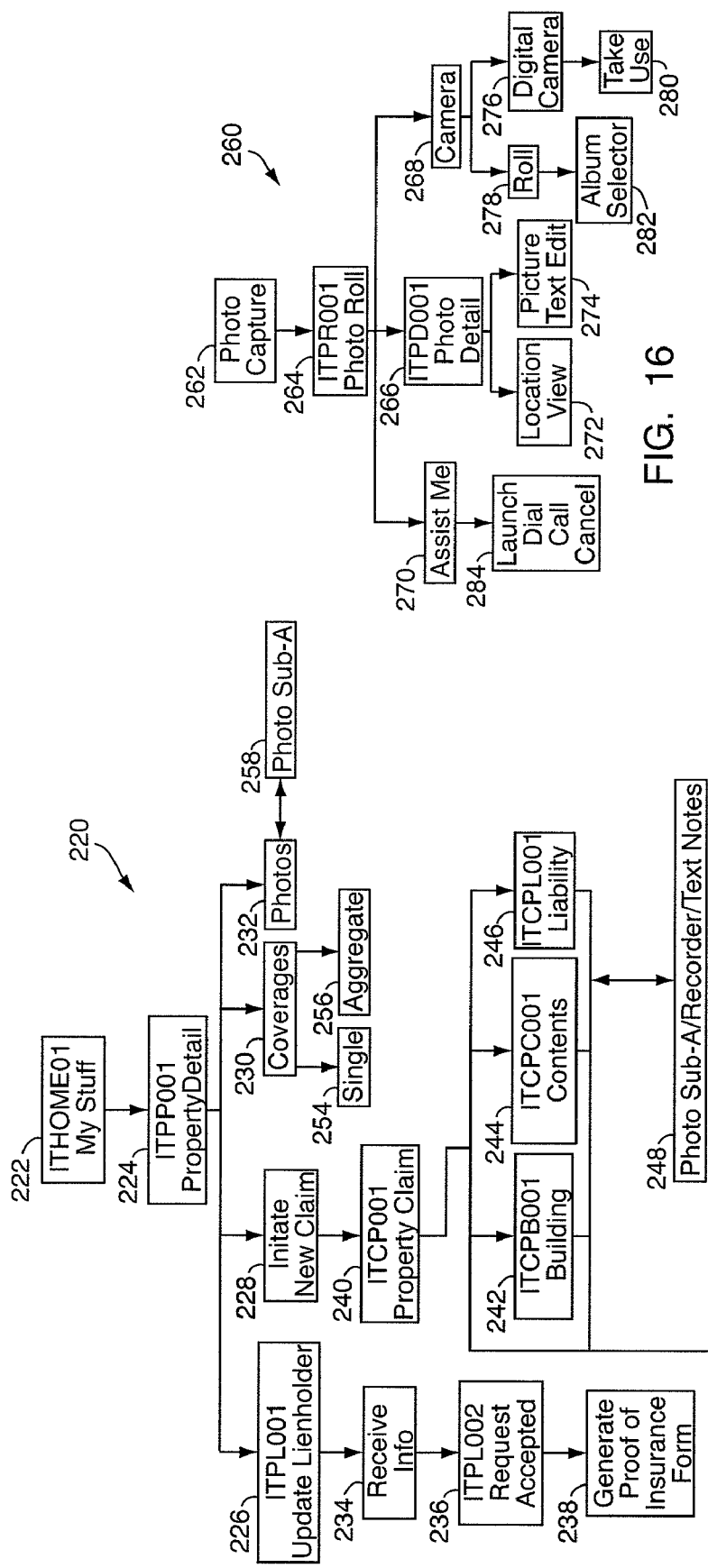
FIG. 15 is a flow diagram of an asset management process, according to another embodiment of the present invention.
FIG. 16 is a flow diagram of a photo capture process, according to one embodiment of the present invention.

Referring to FIG. 15, a process of administering and managing insurance coverage for the property of the insured with the system 30 is illustrated at 220. First, the mobile insurance module 32 receives (step 222) a selection from the insured using the mobile device 12 of a property administration option from a master directory of the mobile insurance module 32 (i.e., labeled "My Stuff"). In response, the mobile insurance module 32 displays (step 224) a listing of previously registered properties of the insured, including property and asset data, and a number of action buttons, including buttons to update a lienholder or mortgagee (step 226), initiate a new claim (step 228), review policy coverages (step 230) and review photographs (step 232). If the mobile insurance module 32 receives (step 226) a selection to update the lienholder of the policy, the mobile insurance module 32 solicits (step 234) updated information from the insured. Then, the mobile insurance module 32 validates (step 236) the updated information. If the updated lienholder or mortgagee information is validated and accepted, the server insurance module 50 generates (step 238) an insurance identification card that is stored on the mobile device 12 and which can be printed immediately as proof of insurance.

If the mobile insurance module 32 receives (step 228) a selection to initiate the new property claim, the mobile insurance module 32 solicits (step 240) information from the insured regarding the accident or the loss associated with the claim and, in particular, as the accident or the loss relates to the property of the insured. Upon entering the information about the asset of the insured, the insured can choose to enter additional information. If the mobile insurance module 32 receives a selection regarding other properties (i.e., to other buildings), other damage (i.e., to contents of the property, such as assets) or liabilities, the mobile insurance module 32 solicits additional information regarding other properties (step 242), other damage (step 244) or liabilities (step 246). Then, if the mobile insurance module 32 receives a selection by the insured to supplement the provided information, the mobile insurance module 32 instructs the insured to capture (step 248) photographs, video recordings, audio recordings and text notes using the various components of the mobile device 12. Once the insured has entered all relevant information and the mobile insurance module 32 receives a request to submit the claim, the mobile insurance module 32 submits (step 250) the claim to the insurer for processing. Then, the server insurance module 50 displays (step 252) the claim status to notify the insured of whether the claim is pending or if the claim has been accepted or denied.

If the mobile insurance module 32 receives (step 230) a selection to review coverages, the mobile insurance module 32 displays a listing of policies held by the insured and a number of action buttons. Upon receiving a selection by the insured to view additional detail regarding a specific policy, the mobile insurance module 32 displays (step 254) the additional detail. Upon receiving a selection by the insured to view additional detail regarding aggregate coverage of all policies, the mobile insurance module 32 displays (step 256) the additional detail.

If the mobile insurance module 32 receives (step 232) a selection to review photographs, the mobile insurance module 32 displays photographs taken by the insured in thumbnail format. Upon receiving a selection by the insured of a photograph, the mobile insurance module 32 edits (step 258) the photographs, for instance, to provide descriptive titles, to add a note or to rearrange the order of the photographs.

Referring to FIG. 16, a process of capturing photographs and video footage is shown at 260. First, the mobile insurance module 32 receives (step 262) a selection from the insured using the mobile device 12 of a photo capture option from a master directory. In response, the mobile insurance module 32 displays (step 264) a listing of recently captured photographs and a number of action buttons, including buttons to review details of the photographs (step 266), activate and switch over to the camera-mode of the mobile device 12 (step 268), and request assistance (step 270). If the mobile insurance module 32 receives (step 266) a selection to review details of the photograph, the mobile insurance module 32 displays a number of action buttons, including buttons to view (step 272) the photograph in a location view or edit (step 274) the metadata text associated with the photograph. If the mobile insurance module 32 receives (step 272) a selection from the insured to view the photograph in a location view, the mobile insurance module 32 displays stored photographs in a superimposed manner on top of a map, based upon the location where each photograph was taken. If the mobile insurance module 32 receives (step 274) a selection from the insured to edit text associated with the photograph, the mobile insurance module 32 solicits updated text from the insured. All entered data is stored in metadata of the photographs. The original date/time stamp and the latitude and longitude location data cannot be altered.

If the insured chooses to activate and switch over to the camera-mode of the mobile device 12, the mobile insurance unit displays a number of action buttons, including buttons to take (step 276) photographs using the camera-mode and to use (step 278) an album viewer of the camera mode to review photographs. If the mobile insurance module 32 receives (step 276) a selection to take photographs using the camera mode, the mobile insurance module 32 activates and switches over (step 280) to the camera mode of the mobile device 12. When the mobile insurance module 32 is next activated, any photographs taken by the insured can be accessed and reviewed within the context of the mobile insurance module 32. If the mobile insurance module 32 receives (step 276) a selection to use an album viewer of the camera, the mobile insurance module 32 activates and switches over (step 282) to a photograph gallery mode of the mobile device 12. All selected photographs, whether from the camera or gallery, have a date/time stamp and latitude and longitudinal location information supplied by the GPS feature of the mobile device 12, which is written to the metadata of the photographs. Neither data element can be altered by editing.

If the mobile insurance module 32 receives (step 270) a selection to request assistance, the mobile insurance module 32 activates and switches over to the phone-mode and dials (step 284) the agent of the insurer for immediate assistance. Alternatively, if the insured has selected that another means of communication for assistance is preferred, such as text or e-mail communication, the mobile insurance module 32 can activate, switch over to and initiate communication using the preferred means of communication. In initiating the assistance, the mobile insurance module 32 authenticates the insured and gathers data associated with the insured, such as policy, vehicle, property and asset and claim data, for immediate use. Thus, the agent of the insurer can better service the insured by eliminating the need for authentication and information gathering.

Figure 17:
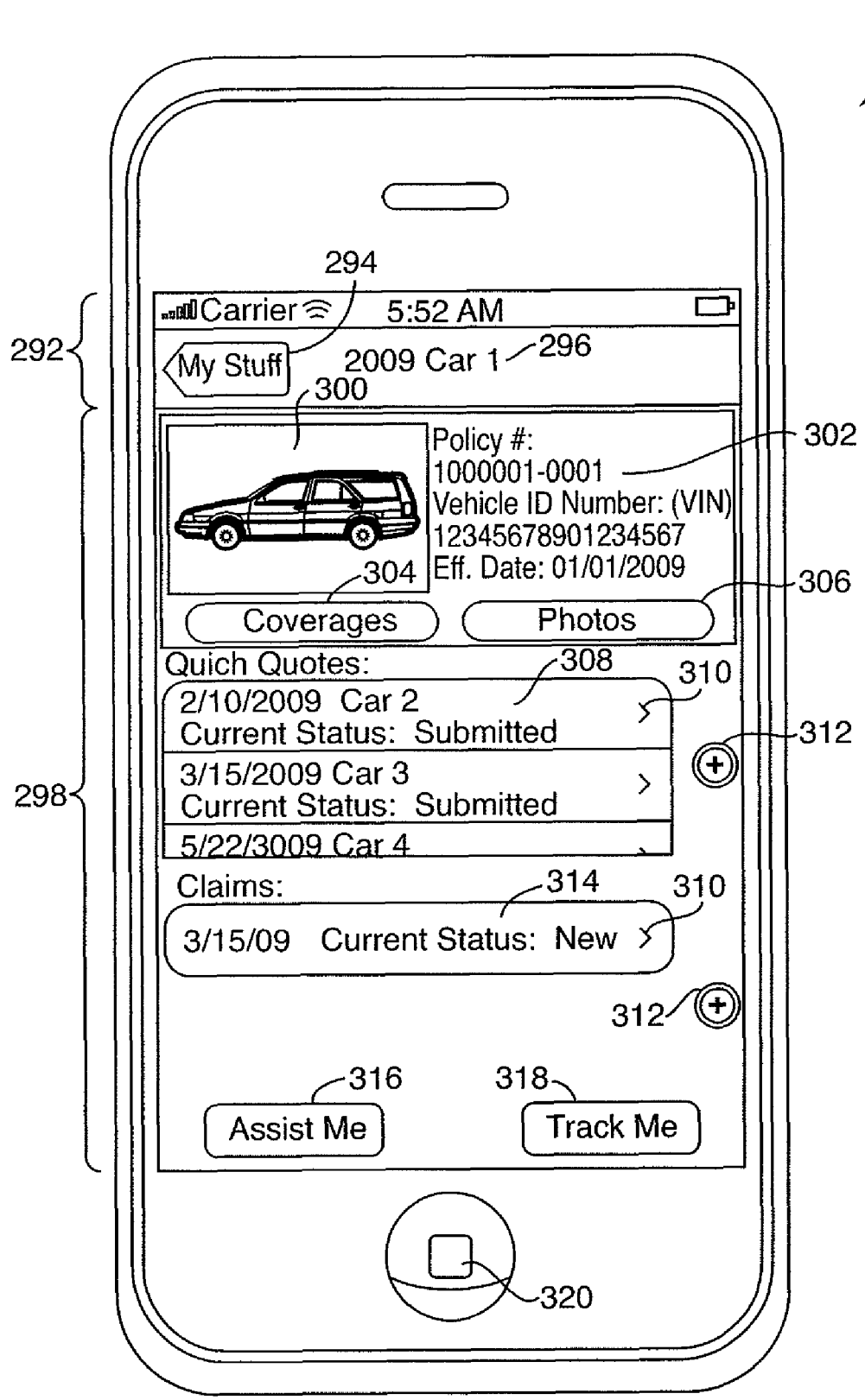
FIG. 17 is an illustration of an exemplary of a mobile device of the insured, having the system, according to one embodiment of the present invention, installed and operating thereon.

Referring to FIG. 17, an example of the mobile insurance module 32 is shown at 290. In particular, the mobile insurance module 32 is shown installed and operating on an Apple iPhone mobile device 12. The user interface 14 of the mobile insurance module 32 includes a title bar 292 at the top of the display of the user interface 14. The title bar 292 includes a return button 294 located toward the left side of the display (e.g., a left pointing arrow labeled "My Stuff", identifying an upper level directory). The title bar 292 includes a description 296 that is centered in the title bar 292, identifying the current content of the display. The title bar 292 can also include a right action button (not shown) located toward the right side of the display. The right action button can provide many functionalities based on the context of the current content of the display, for instance, including an edit function and a save function.

The user interface 14 of the mobile insurance module 32 also includes a body 298, which consists mainly of insurance data and tables. From top to bottom, the body 298 is shown as having a photograph 300 of the vehicle of the insured located side by side with key insurance data 302, such as a policy number of a policy associated with the vehicle the insured, a vehicle identification number of the vehicle of the insured and an effective date of the policy. Below this, the body 298 is shown as having a coverage action button 304 for reviewing coverages and a photographs action button 306 for reviewing photographs. Below the action buttons 304, 306, the body 298 is shown as having quick quote data 308 including several quick quotes, a date on which the request for a quick quote was submitted, a description of the vehicle for which the quick quote is associated, and a description of the status of the quick quote. Alongside each quick quote is an expand icon 310 that, when activated, shows additional details regarding the associated item, and an add entry icon 312 that, when activated, creates a new occurrence of the table item. Below this, the body 298 is shown as having claim data 314 including a claim, a date on which the claim was submitted and a status of the claim, alongside another expand icon 310 and another add entry icon 312. Toward the bottom, the body 298 is shown as having an Assist Me action button 316 that, when activated, initiates a communication with the agent of the insurer and a Track Me action button 318 that, when activated, enables the GPS mode of the mobile device 12 and places the mobile insurance module 32 in a stealth tracking mode. These action buttons can also include a Submit action button (not shown) that submits the transaction in progress to the server insurance module 50 for immediate processing. In addition, in the illustrated example, the iPhone mobile device 12 also includes an iPhone Home action button 320, which automatically saves all data to a database local to the mobile device 12, exits the mobile insurance module 32, and returns the mobile device 12 to the iPhone Application Menu.

The user interface 14 and, in particular, the display of the mobile insurance module 32 is readily configurable according to insured-inputted preferences. For instance, the insured can select from a range of preferences, including the following:

TABLE 34

Insured Inputted Preferences for the User Interface

| Category | Format | Description |
| --- | --- | --- |
| Currency | $$-$$K | Dollar range, rounded to the nearest thousand, with "K" |
|  | $$$K | Dollar amount, rounded to the nearest thousand, with "K" |
|  | $$$$ | Dollar amount, rounded up, no cents, no commas |
|  | $$.$K | Dollar amount, rounded to the nearest fractional thousand with "K" |

TABLE 34-continued

Insured Inputted Preferences for the User Interface

| Category | Format | Description |
|---|---|---|
| Dates | MM/YY | 99/99 (Last two digits of the year) |
| | DD/MM/YY | 99/99/99 (Last two digits of the Year) |
| | DD/MM/YYYY | 99/99/9999 (All four digits of the Year) |
| Addresses | CSZ | City, State (AA), Zip Code (99999 or 99999-9999 integers) |
| | Z | Zip Code (99999 or 99999-9999 integers) |
| | StZ | Street with House or Apartment Number, Zip Code (99999 or 99999-9999 integers) |
| | St | Street with House or Apartment Number |
| | StC | Street with House or Apartment Number, City |
| Names | LF | Last/First |
| | FML | First/Middle/Last |
| | F | First (only) |
| | N | Nickname |
| Location | LL6 | 99.999999 North/South, 999.999999 East/West |
| | LL0 | 99 North/South, 999 East/West |
| iPhone | SN | 9999AAAA9A (Serial Number) |
| | MOD | AA999AA (Model) |
| | CAP | 99.9 (Capacity in Gigabytes) |
| | VER | 99.99 (Software Version) |
| | NUM | 999-999-9999 (Phone Number) |
| Automobile | MkMdY | Make (AAAA)/Model (AAAA)/Year (99) |
| | Mk | Vehicle Make (AAAAAAAAAA) |
| Definitions | $ | Means a whole dollar value |
| | 9 | Means a numeric value |
| | A | Means an character value |
| | X | Means any ASCII character |
| | — | Means a space |
| | :, &, @, /, %, *, etc. | Means the specific designated special character or symbol |

It should be understood that the foregoing description is only illustrative of the invention. Various alternatives and modifications can be devised by those skilled in the art without departing from the broader aspects of the present invention.

According to an alternative embodiment, the mobile insurance module can generate a quick quote for a property based on data received from the global positioning system mode of the mobile device. For instance, by capturing the longitude and latitude of the mobile device at the moment the quick quote is requested, the system can identify the property and generate a quick quote using third party data sources and the proprietary pricing models of the insurer.

According to an alternative embodiment, the server insurance module or the customer service representative insurance module can register the insurer with the system.

According to an alternative embodiment, the system can securely photo-archive disaster sensitive assets whether insured or not, such as financial records, and other valuable home contents with a protected date/time stamp and latitude and longitude location data in the metadata of the photographs so that the photographs may be considered evidentiary documents.

According to an alternative embodiment, the system can be applied to other forms of property and casualty insurance as well as marine insurance and surety.

What is claimed is:

1. A method for making a claim on an insured loss, said method comprising:
    establishing a communication channel between a mobile insurance module of a mobile device associated with an insured and a server insurance module of a server associated with an insurer
    connecting the insured, via the communication channel, with a customer service representative of the insurer or of an insurance agency, wherein the step of connecting the insured is accomplished by authenticating a unique signature of the mobile device with the insured's policy data in a database of the server insurance module, said policy data including the insured's personal information and insurance coverage, and including information for selecting the customer service representative;
    transmitting a request for assistance across the communication channel, wherein the request for assistance includes data captured by the mobile device at a scene of the insured loss, said data including any of a GPS location, a nature of the insured loss, or evidence of the insured loss; and
    causing a display to the customer service representative of the request for assistance and at least some of the policy data.

2. The method of claim 1, further comprising:
    capturing insurance data using a mode of the mobile device selected from the group consisting of: a telephone mode, a short message service text mode, an e-mail mode, a camera mode, a video recorder mode, a voice recorder mode, a global positioning system mode and a touch screen interface mode; and
    transmitting the insurance data across the communication channel using the mobile insurance module of the mobile device.

3. The method of claim 2, further comprising:
    supplementing the insurance data by requesting additional insurance data from third party providers;
    wherein the step of transmitting the insurance data transmits all of the insurance data, including the additional insurance data, required to provide the insurance service;
    wherein the step of providing the insurance service occurs substantially immediately after the step of establishing the communication channel.

4. The method of claim 1, wherein the mobile insurance module uses a related table data structure.

5. The method of claim 1, further comprising:
periodically collecting a latitude and a longitude of the mobile device using a global positioning system mode of the mobile device;
transmitting a request for assistance across the communication channel using the mobile insurance module of the mobile device, wherein the request includes the latitude and the longitude of the mobile device;
periodically transmitting the latitude and the longitude of the mobile device until terminated by the mobile device; and
wherein the date/timestamp and latitude/longitude are recorded in the metadata of the insurance information for authenticity.

6. The method of claim 1, further comprising:
downloading the mobile insurance module using the mobile device;
installing the mobile insurance module on the mobile device; and
registering a user account using the mobile insurance module, wherein the step of registering further comprises transmitting insurance data across the communication channel, wherein the insurance data includes an identifier of the mobile device.

7. A system for connecting an insured to an insurer, said system comprising:
a mobile device associated with the insured, having a first processor and a first memory, wherein said first memory has a mobile insurance module stored therein, said first processor configured to implement the mobile insurance module,
wherein implementation of the mobile insurance module configures the mobile device to establish a communication channel from the mobile device through a server associated with the insurer, and
to store, in the first memory, insurance data including a listing of insured assets, a listing of insurance policies corresponding to the insured assets, and contact information corresponding to each of the listed insurance policies,
wherein the mobile device is configured to establish the communication channel by transmitting to the server a unique signature of the mobile device for selecting a customer service representative of the insurer.

8. The system of claim 7, wherein the mobile device further comprises a mode from the group consisting of:
a telephone mode, a short message service text mode, an e-mail mode, a camera mode, a video recorder mode, a voice recorder mode, a global positioning system mode and a touch screen interface mode; and
wherein the mobile insurance module is configured for capturing insurance data using the mode of the mobile device, and transmitting the insurance data to the server via the communication channel.

9. The system of claim 8, wherein the mobile insurance module is self-authenticated to communicate across the communication channel based on an identifier of the mobile device; and
wherein the mobile insurance module is configured to collect all insurance data required to process, approve and deliver the insurance service across the communication channel.

10. The system as claimed in claim 7, further comprising the server, wherein the server is networked with an insured customer database and with a third party data source, and the mobile insurance module configures the mobile device to transfer data to and from the insured customer database and the third party data source via the server insurance module, such that the insurance data in the first memory substantially mirrors data associated with a user of the mobile device in the insured customer database and in the third party data source.

11. The system as claimed in claim 7, wherein the mobile insurance module is further configured to select the customer service representative with whom to connect the insured, based on an insured asset selected via the mobile insurance module.

12. The system as claimed in claim 7, wherein the insurance data can include pre-loss and post-loss data associated with at least one insured asset.

13. A method for providing an insurance service via a mobile device, said method comprising:
establishing a communication channel from the mobile device to a server of an insurer;
connecting an insured, via the communication channel, with a customer service representative of the insurer, wherein the step of connecting the insured includes transmitting from the mobile device to the server a unique signature of the mobile device for selecting the customer service representative; and
causing a display to the customer service representative of insurance information corresponding to the unique signature of the mobile device.

14. The method of claim 13, further comprising:
transmitting a request for a quick quote of a policy across the communication channel using the mobile insurance module, wherein the quick quote includes a binder;
transmitting an acceptance of the binder to purchase the policy across the communication channel using the mobile insurance module; and
receiving an insurance identification card across the communication channel using the mobile insurance module, wherein the insurance identification card is proof of insurance.

15. The method of claim 14, further comprising:
transmitting a claim request across the communication channel using the mobile insurance device;
wherein the step of providing the insurance service further comprises:
immediately receiving notification of settlement of the claim request and release of funds across the communication channel using the mobile insurance device.

16. The method of claim 13, wherein the insurance information is retrieved from the server of the insurer.

* * * * *